US012759933B2

(12) United States Patent
Lindberg et al.

(10) Patent No.: US 12,759,933 B2
(45) Date of Patent: Oct. 13, 2026

(54) CEMENT PRODUCTION SYSTEM AND PROCESS POWERED BY GEOTHERMAL ENERGY

(71) Applicant: EnhancedGEO Holdings, LLC, St. Petersburg, FL (US)

(72) Inventors: Greg Lindberg, Thonotosassa, FL (US); Kimberly C. Conner, Wetumpka, AL (US); James Michael Browning, Humble, TX (US)

(73) Assignee: Enhanced GEO Holdings LLC, Thonotosassa, FL (US)

( * ) Notice: Subject to any disclaimer, the term of this patent is extended or adjusted under 35 U.S.C. 154(b) by 458 days.

(21) Appl. No.: 18/367,837

(22) Filed: Sep. 13, 2023

(65) Prior Publication Data

US 2025/0083999 A1 Mar. 13, 2025

(51) Int. Cl.

| | |
|---|---|
| ***C04B 7/44*** | (2006.01) |
| ***C04B 7/47*** | (2006.01) |
| ***C04B 7/52*** | (2006.01) |
| ***F03G 4/00*** | (2006.01) |
| ***F24T 10/10*** | (2018.01) |
| ***F27B 7/10*** | (2006.01) |
| *F27B 7/36* | (2006.01) |

(52) U.S. Cl.

CPC .............. *C04B 7/4407* (2013.01); *C04B 7/47* (2013.01); *C04B 7/52* (2013.01); *F03G 4/00* (2021.08); *F24T 10/10* (2018.05); *F27B 7/10* (2013.01); *F27B 7/36* (2013.01)

(58) Field of Classification Search

CPC ........... C04B 7/36; C04B 7/364; C04B 7/367; C04B 7/43; C04B 7/432; C04B 7/44; C04B 7/4407; C04B 7/47; C04B 7/475; C04B 7/52; C04B 2290/20; F24T 10/10; F24T 10/13; F24T 50/00; F03G 4/00; F27B 7/08; F27B 7/10; F27B 7/2016; F27B 7/36; B28C 9/02; B28C 5/466

See application file for complete search history.

(56) References Cited

U.S. PATENT DOCUMENTS

| | | | |
|---|---|---|---|
| 227,908 | A | 5/1880 | Magill |
| 1,043,129 | A | 11/1912 | Murphy |

(Continued)

FOREIGN PATENT DOCUMENTS

| | | |
|---|---|---|
| AU | 2018308861 A1 | 1/2020 |
| AU | 2017268378 B2 | 9/2021 |

(Continued)

OTHER PUBLICATIONS

Behzadi et al., Thermoeconomic analysis of a hybrid PVT solar system integrated with double effect absorption chiller for cooling/ hydrogen production; Energy Equipment andSystems, vol. 6, Issue 4—Serial No. 4 (Dec. 2018), p. 413-427.

(Continued)

*Primary Examiner* — Loren C Edwards
(74) *Attorney, Agent, or Firm* — Kenneth M. Whitcomb

(57) ABSTRACT

A cement production system includes a wellbore extending from a surface into an underground magma reservoir. The wellbore is configured to heat a heat transfer fluid via heat transfer with the underground magma reservoir. Processes for cement production are driven at least in part by energy obtained from the underground magma reservoir.

18 Claims, 11 Drawing Sheets

(56) References Cited

U.S. PATENT DOCUMENTS

| | | | |
|---|---|---|---|
| 1,382,255 A | 6/1921 | Thomson et al. | |
| 1,853,351 A | 4/1932 | Hayes | |
| 1,882,314 A | 10/1932 | Burt | |
| 2,299,548 A | 10/1942 | Maier | |
| 2,618,342 A | 11/1952 | Meyer | |
| 2,756,139 A | 7/1956 | Brooks et al. | |
| 2,777,398 A | 1/1957 | Carpenter | |
| 2,827,370 A | 3/1958 | Wilcox | |
| 2,918,259 A | 12/1959 | Bus, Sr. | |
| 2,929,612 A | 3/1960 | Bus, Sr. | |
| 3,061,336 A | 10/1962 | Waggener | |
| 3,113,860 A | 12/1963 | Pagel | |
| 3,150,962 A | 9/1964 | Pearson | |
| 3,280,923 A | 10/1966 | Muench | |
| 3,398,794 A | 8/1968 | Fox, Jr. | |
| 3,459,953 A | 8/1969 | Brauser et al. | |
| 3,498,381 A | 3/1970 | Earlougher, Jr. | |
| 3,508,412 A | 4/1970 | Yearout | |
| 3,606,173 A | 9/1971 | Rowland | |
| 3,613,806 A | 10/1971 | Malott | |
| 3,757,516 A | 9/1973 | McCabe | |
| 3,765,477 A | 10/1973 | Van | |
| 3,864,208 A | 2/1975 | Van Huisen | |
| 3,941,511 A | 3/1976 | Morgan | |
| 3,950,949 A | 4/1976 | Martin et al. | |
| 3,957,108 A | 5/1976 | Van Huisen | |
| 3,966,569 A | 6/1976 | Reinhardt et al. | |
| 3,967,675 A * | 7/1976 | Georgii ..................... | F03G 7/04 165/45 |
| 4,043,129 A | 8/1977 | McCabe et al. | |
| 4,047,093 A | 9/1977 | Levoy | |
| 4,054,176 A | 10/1977 | Van Huisen | |
| 4,057,108 A | 11/1977 | Broussard | |
| 4,116,285 A | 9/1978 | Guerber | |
| 4,140,184 A | 2/1979 | Bechtold et al. | |
| 4,171,019 A | 10/1979 | Cole | |
| 4,286,651 A | 9/1981 | Steiger et al. | |
| 4,290,882 A | 9/1981 | Dempsey | |
| 4,439,213 A | 3/1984 | Frey et al. | |
| 4,492,083 A | 1/1985 | McCabe et al. | |
| 4,497,370 A | 2/1985 | Breslin | |
| 4,511,461 A | 4/1985 | Kruyer | |
| 4,642,987 A | 2/1987 | Csorba et al. | |
| 4,665,705 A | 5/1987 | Bonham, Jr. | |
| 4,776,169 A | 10/1988 | Coles, Jr. | |
| 4,929,348 A | 5/1990 | Rice | |
| 4,945,947 A | 8/1990 | Westra et al. | |
| 4,999,097 A | 3/1991 | Sadoway | |
| 5,094,746 A | 3/1992 | Bush | |
| 5,143,150 A | 9/1992 | Johnston | |
| 5,490,398 A | 2/1996 | Cline | |
| 5,513,573 A | 5/1996 | Sutton | |
| 5,515,679 A | 5/1996 | Shulman | |
| 5,516,408 A | 5/1996 | Peckham et al. | |
| 5,661,977 A | 9/1997 | Shnell | |
| 5,860,279 A | 1/1999 | Bronicki et al. | |
| 5,911,684 A | 6/1999 | Shnell | |
| 5,921,320 A | 7/1999 | Shulyatikov et al. | |
| 6,237,404 B1 | 5/2001 | Crary et al. | |
| 6,708,494 B1 | 3/2004 | Hamann | |
| 7,124,584 B1 | 10/2006 | Wetzel et al. | |
| 7,331,179 B2 | 2/2008 | Balan et al. | |
| 7,597,138 B1 | 10/2009 | Koenig | |
| 7,891,188 B2 | 2/2011 | Zachar | |
| 8,011,450 B2 | 9/2011 | Krueger et al. | |
| 8,012,318 B2 | 9/2011 | Marsden et al. | |
| 8,047,285 B1 | 11/2011 | Smith | |
| 8,201,409 B1 | 6/2012 | Zakiewicz | |
| 8,522,887 B1 | 9/2013 | Madison | |
| 8,524,787 B2 | 9/2013 | Ermolaev et al. | |
| 8,701,432 B1 | 4/2014 | Olson | |
| 8,734,546 B2 | 5/2014 | McAlister | |
| 9,006,298 B2 | 4/2015 | Leviness et al. | |
| 9,028,171 B1 | 5/2015 | Seldner | |
| 9,108,858 B2 | 8/2015 | McDonald et al. | |
| 9,150,423 B2 | 10/2015 | Hosono et al. | |
| 9,181,931 B2 | 11/2015 | McBay | |
| 9,182,149 B2 | 11/2015 | Gilaberte et al. | |
| 9,298,756 B1 | 3/2016 | Johnson | |
| 9,359,271 B2 | 6/2016 | Leviness et al. | |
| 9,388,797 B2 | 7/2016 | Bronicki | |
| 9,541,309 B2 | 1/2017 | Colwell | |
| 9,574,551 B2 | 2/2017 | Parrella, Sr. et al. | |
| 9,650,313 B2 | 5/2017 | Tippet et al. | |
| 9,738,835 B2 | 8/2017 | Schrauwen | |
| 9,765,605 B2 | 9/2017 | Williamson et al. | |
| 10,017,395 B2 | 7/2018 | Kageyama et al. | |
| 10,018,026 B2 | 7/2018 | McBay | |
| 10,058,848 B2 | 8/2018 | Lipiec et al. | |
| 10,131,545 B2 | 11/2018 | Sekine et al. | |
| 10,173,202 B2 | 1/2019 | Hosono et al. | |
| 10,203,162 B2 | 2/2019 | Yokomine et al. | |
| 10,208,253 B2 | 2/2019 | McNamara et al. | |
| 10,279,306 B2 | 5/2019 | Gebald et al. | |
| 10,322,940 B2 | 6/2019 | Hosono et al. | |
| 10,330,348 B2 | 6/2019 | McBay | |
| 10,344,233 B2 | 7/2019 | Lucas et al. | |
| 10,358,604 B2 | 7/2019 | Harris et al. | |
| 10,710,049 B2 | 7/2020 | Mikhajlov et al. | |
| 10,745,625 B2 | 8/2020 | Dogterom et al. | |
| 10,759,668 B2 | 9/2020 | Hosono et al. | |
| 10,787,894 B2 | 9/2020 | McBay | |
| 10,792,645 B2 | 10/2020 | Hosono et al. | |
| 10,914,293 B2 | 2/2021 | McBay | |
| 10,954,924 B2 | 3/2021 | Moncarz et al. | |
| 10,974,969 B2 | 4/2021 | Hu et al. | |
| 11,131,484 B2 | 9/2021 | Mcbay | |
| 11,235,310 B2 | 2/2022 | Hosono et al. | |
| 11,286,169 B2 | 3/2022 | Beach et al. | |
| 11,325,105 B2 | 5/2022 | Beach et al. | |
| 11,584,888 B2 | 2/2023 | Mleczko et al. | |
| 11,841,172 B2 | 12/2023 | Lindberg et al. | |
| 11,852,383 B2 | 12/2023 | Lindberg et al. | |
| 11,897,828 B1 | 2/2024 | Lindberg et al. | |
| 11,905,797 B2 | 2/2024 | Lindberg et al. | |
| 11,905,814 B1 | 2/2024 | Smith et al. | |
| 11,913,679 B1 | 2/2024 | Lindberg et al. | |
| 11,918,967 B1 | 3/2024 | Lindberg et al. | |
| 12,060,765 B1 | 8/2024 | Stone et al. | |
| 12,209,776 B2 | 1/2025 | Lindberg et al. | |
| 2002/0104328 A1 | 8/2002 | DiFoggio | |
| 2003/0005698 A1 | 1/2003 | Keller | |
| 2003/0145592 A1 | 8/2003 | Stratford | |
| 2004/0084182 A1 | 5/2004 | Edgar et al. | |
| 2004/0131488 A1 | 7/2004 | Locher | |
| 2004/0265158 A1 | 12/2004 | Boyapati et al. | |
| 2005/0217991 A1 | 10/2005 | Dahlquist | |
| 2006/0026961 A1 | 2/2006 | Bronicki | |
| 2006/0065545 A1 | 3/2006 | Balan et al. | |
| 2006/0123952 A1 | 6/2006 | Wilson et al. | |
| 2006/0180537 A1 | 8/2006 | Loftis et al. | |
| 2006/0277917 A1 | 12/2006 | Hsu | |
| 2007/0079617 A1 | 4/2007 | Farmer et al. | |
| 2007/0151244 A1 | 7/2007 | Gurin | |
| 2007/0289863 A1 | 12/2007 | Manousiouthakis et al. | |
| 2008/0213157 A1 | 9/2008 | McGrady et al. | |
| 2008/0216478 A1 | 9/2008 | Cherry | |
| 2008/0283411 A1 | 11/2008 | Eastman et al. | |
| 2009/0014336 A1 | 1/2009 | Olah et al. | |
| 2009/0120288 A1 | 5/2009 | Lackner et al. | |
| 2009/0183879 A1 | 7/2009 | Cox | |
| 2009/0226308 A1 | 9/2009 | Vandor | |
| 2009/0227185 A1 | 9/2009 | Summers et al. | |
| 2009/0321323 A1 | 12/2009 | Sharma et al. | |
| 2010/0025260 A1 | 2/2010 | Naterer et al. | |
| 2010/0045042 A1 | 2/2010 | Hinders et al. | |
| 2010/0089645 A1 | 4/2010 | Trinh et al. | |
| 2010/0269501 A1 | 10/2010 | Parrella | |
| 2011/0167819 A1 | 7/2011 | Lakic | |
| 2011/0232858 A1 | 9/2011 | Hara | |
| 2012/0144829 A1 | 6/2012 | Wiggs et al. | |
| 2012/0175077 A1 | 7/2012 | Lehmann et al. | |
| 2012/0192563 A1 | 8/2012 | Kauffman et al. | |
| 2012/0237440 A1 | 9/2012 | Kodama et al. | |

(56) References Cited

U.S. PATENT DOCUMENTS

2013/0101492 A1 4/2013 McAlister
2013/0153399 A1 6/2013 McAlister
2013/0232973 A1* 9/2013 McBay .................. F28D 15/00 165/45
2013/0234444 A1 9/2013 Rogers et al.
2013/0283791 A1 10/2013 Riley
2013/0333383 A1 12/2013 Schwarck
2013/0336879 A1 12/2013 Yamazaki
2014/0010742 A1 1/2014 Hanna et al.
2014/0026602 A1 1/2014 Yabase et al.
2014/0047836 A1 2/2014 Parrella
2014/0205519 A1 7/2014 Shaw et al.
2014/0262137 A1 9/2014 McBay
2014/0284045 A1 9/2014 McBay
2014/0309936 A1 10/2014 Abbassian et al.
2015/0027721 A1 1/2015 Shreider et al.
2015/0033745 A1 2/2015 Bastian, II et al.
2015/0033793 A1 2/2015 Griffiths
2015/0107243 A1 4/2015 Parrella, Sr. et al.
2015/0114639 A1 4/2015 Williamson et al.
2015/0117956 A1 4/2015 Seldner
2015/0122453 A1 5/2015 Colwell
2015/0128931 A1 5/2015 Joshi et al.
2015/0159918 A1 6/2015 Parrella et al.
2015/0174522 A1 6/2015 Eisenberger et al.
2015/0300327 A1 10/2015 Sweatman et al.
2015/0361833 A1 12/2015 Hinders et al.
2015/0368565 A1 12/2015 Schrauwen
2015/0377211 A1 12/2015 Occhiello
2016/0097376 A1 4/2016 Wasyluk et al.
2016/0115945 A1 4/2016 Barsi et al.
2016/0123116 A1 5/2016 Randle et al.
2016/0194767 A1 7/2016 Mulder
2016/0251953 A1 9/2016 Samuel et al.
2016/0312371 A1 10/2016 Kamei et al.
2016/0363350 A1 12/2016 Tahara
2017/0106331 A1 4/2017 Aronu et al.
2017/0113184 A1 4/2017 Eisenberger
2017/0253492 A1 9/2017 Beach et al.
2017/0260829 A1 9/2017 Aadnøy
2017/0268803 A1 9/2017 Cauchy
2018/0010049 A1 1/2018 Tenore et al.
2018/0016872 A1 1/2018 Randle
2018/0081339 A1 3/2018 Zhu et al.
2018/0106138 A1 4/2018 Randolph
2018/0112916 A1 4/2018 Jia
2018/0155638 A1 6/2018 Al-Ghamdi et al.
2018/0224164 A1 8/2018 Lakic
2018/0224215 A1 8/2018 Thiers et al.
2019/0032446 A1 1/2019 Gronning
2019/0055930 A1 2/2019 Muir et al.
2019/0078423 A1 3/2019 Haci
2019/0093017 A1 3/2019 Zhu
2019/0157074 A1 5/2019 Delmas et al.
2019/0178391 A1 6/2019 Gottlieb et al.
2019/0264978 A1 8/2019 Van Amelsvoort et al.
2019/0359894 A1 11/2019 Heidel et al.
2019/0372137 A1 12/2019 Planque et al.
2019/0390660 A1 12/2019 McBay
2020/0011151 A1 1/2020 Toews et al.
2020/0040267 A1 2/2020 Van Willigenburg et al.
2020/0072199 A1 3/2020 Fontana et al.
2020/0080771 A1 3/2020 Cooper
2020/0086273 A1 3/2020 Medoff et al.
2020/0131446 A1 4/2020 Wohaibi et al.
2020/0200438 A1 6/2020 McBay
2020/0231455 A1 7/2020 Beach et al.
2020/0325030 A1 10/2020 Cussler et al.
2020/0353518 A1 11/2020 Chandran et al.
2021/0025241 A1 1/2021 Crichlow
2021/0025265 A1 1/2021 Randolph
2021/0025623 A1 1/2021 Holtzman
2021/0087472 A1 3/2021 Garcia-Perez et al.
2021/0114005 A1 4/2021 Tao et al.
2021/0122656 A1 4/2021 Willberg et al.
2021/0172266 A1 6/2021 Dietz et al.
2021/0207670 A1 7/2021 Qi et al.
2021/0230391 A1 7/2021 Parrott et al.
2021/0262317 A1 8/2021 Gravois
2021/0270496 A1 9/2021 Holtzman
2021/0348489 A1 11/2021 O'Malley et al.
2021/0371990 A1 12/2021 Amaya et al.
2021/0387135 A1 12/2021 Dubois et al.
2021/0404439 A1 12/2021 Kinsella
2022/0034552 A1 2/2022 Sai et al.
2022/0049592 A1 2/2022 McBay
2022/0099367 A1 3/2022 Krishnamurthy et al.
2022/0128298 A1 4/2022 Thomas et al.
2022/0154978 A1 5/2022 McBay
2022/0290053 A1 9/2022 Mleczko et al.
2022/0306949 A1 9/2022 Nierode et al.
2023/0022441 A1 1/2023 Deng et al.
2023/0098572 A1 3/2023 Klussmann et al.
2023/0114197 A1 4/2023 Hughes
2023/0130169 A1 4/2023 McIntyre
2023/0203386 A1 6/2023 Nierode et al.
2023/0272946 A1 8/2023 Lindberg et al.
2023/0272947 A1 8/2023 Lindberg et al.
2023/0296086 A1 9/2023 Lindberg et al.
2023/0304705 A1 9/2023 Lindberg et al.
2023/0349265 A1 11/2023 Lindberg et al.
2024/0024815 A1 1/2024 Rousselet et al.
2024/0229268 A1 7/2024 Goto et al.
2024/0271489 A1 8/2024 Lindberg et al.
2024/0271543 A1 8/2024 Lindberg et al.
2024/0271828 A1 8/2024 Lindberg et al.
2024/0271829 A1 8/2024 Lindberg et al.
2024/0271832 A1 8/2024 Lindberg et al.
2024/0279825 A1 8/2024 Krishnamurthy et al.
2024/0295346 A1 9/2024 Lindberg et al.
2025/0059340 A1 2/2025 Lindberg et al.
2025/0059341 A1 2/2025 Lindberg et al.
2025/0059342 A1 2/2025 Lindberg et al.
2025/0059343 A1 2/2025 Lindberg et al.
2025/0122771 A1 4/2025 Steele
2025/0179890 A1 6/2025 Witte et al.
2025/0230371 A1 7/2025 Conner et al.
2025/0277318 A1 9/2025 Strange

FOREIGN PATENT DOCUMENTS

AU 2016398360 B2 1/2022
CA 2679905 A1 3/2011
CN 204371248 U 6/2015
CN 105148824 A 12/2015
CN 106837176 A 6/2017
CN 107326195 A 11/2017
CN 107385472 A 11/2017
CN 107675211 A 2/2018
CN 108952650 A 12/2018
CN 112604697 A 4/2021
CN 113494273 A 10/2021
CN 113562692 A 10/2021
CN 216741858 U 6/2022
EP 0236640 A1 9/1987
EP 0326736 A2 8/1989
EP 2792010 B1 1/2018
EP 3472110 A1 4/2019
EP 3583321 A1 12/2019
GB 544112 A 3/1942
GB 2592695 A 9/2021
GB 2615913 A 8/2023
JP H07286760 A 10/1995
JP h10510892 B 10/1998
JP 2011052621 A 3/2011
JP 5502006 B2 10/2012
JP 5341482 B 11/2013
JP 2014202149 A 10/2014
JP 2018200027 A 12/2018
JP 2020067027 A 4/2020
NO 345651 5/2021
RU 2406853 C2 12/2010
RU 2529769 C2 9/2014
RU 2686656 C1 4/2019

(56) References Cited

FOREIGN PATENT DOCUMENTS

| | | | | | |
|---|---|---|---|---|---|
| WO | 2009116873 | A1 | | 9/2009 | |
| WO | 2012079078 | A2 | | 6/2012 | |
| WO | 2012037571 | A3 | | 7/2012 | |
| WO | 2012106020 | A1 | | 8/2012 | |
| WO | 2013025640 | A2 | | 2/2013 | |
| WO | 2013120132 | A1 | | 8/2013 | |
| WO | 2013169242 | A1 | | 11/2013 | |
| WO | 2015066764 | A1 | | 5/2015 | |
| WO | 2016204287 | A1 | | 12/2016 | |
| WO | 2019161114 | A1 | | 8/2019 | |
| WO | 2020150245 | A1 | | 7/2020 | |
| WO | 2020160500 | A1 | | 8/2020 | |
| WO | 2021046633 | A1 | | 3/2021 | |
| WO | 2021180893 | A1 | | 9/2021 | |
| WO | 2021188547 | A1 | | 9/2021 | |
| WO | 2022043947 | A1 | | 3/2022 | |
| WO | 2021257944 | A9 | | 4/2022 | |
| WO | 2022123626 | A1 | | 6/2022 | |
| WO | 2022170390 | A1 | | 8/2022 | |
| WO | 2022187903 | A1 | | 9/2022 | |
| WO | 2022211643 | A1 | | 10/2022 | |
| WO | WO-2023062279 | A1 | * | 4/2023 | ............... C01B 3/24 |
| WO | 2023145767 | A1 | | 8/2023 | |

OTHER PUBLICATIONS

Boehm, R.F. et al, Modelling of a Magma Energy Geothermal Power Plant, presented at ASME Winter Annual Meeting, Boston MA, Dec. 1987, SAND-87-0564C, DE88 003793, 11 pages.

Colp, John L., Final Report—Magma Energy Research Project, Sandia Report, Sand82-2377, Unlimited Release, UC-66, prepared by Sandia National Laboratories under contrace DE-AC04-76DP00789, Printed Oct. 1982, 42 pages.

Dunn, "Energy Extraction from Crustal Magma Bodies"; Sandia National Laboratories (1982), p. 1-18; URL: https://osti.gov/servlets/purl/6740186-LNgWIn/.

Eichelberger, John C., et al. "Magma-sourced geothermal energy and plans for Krafla Magma Testbed, Iceland." Proceedings World Geotherm Congress. vol. 1. 2020. (Year: 2020).

El Tayeb, "Fabrication, Characterisation and Analysis of Ceria Thin Films and Patterned Nanostructured Deposits for Enhanced Solar-Driven Thermochemical Conversion"; Thesissubmitted in partial fulfillment of the requirement for the degree of doctor of philosophy, Dublin City University (Nov. 2016), p. 1-175.

Elders et al, "Drilling into Magma and the Implications of the Iceland Deep Drilling Project (IDDP) for High-Temperature Geothermal Systems Worldwide", Geothermics, Jun. 24, 2013, vol. 49, pp. 111-118.

Foroutan, Abdolrahim et al. Critical importance of pH and collector type on the flotation of sphalerite and galena from a low-grade lead-zinc ore. Nature: Scientific Reports. 11:3103. pp. 1-11. https://doi.org/10.1038/s41598-021-82759-3. (Year: 2021).

Kohad, V.P. Flotation of sulphide ores—HXL experience. IIME, Jamshedpur pp. 18-41 (Year: 1998).

Lazarov, D. et al. Effect of temperature on the kinetics of froth flotation. Minerals Engineering. 7:4 pp. 503-509 (Year: 1994).

Melting Points of Rocks and Minerals (Year: 2020); https://www.hsc.edu.kw/student/materials/Physics/website/hyperphysicsmodified/hbase/geophys/meltrock.html; downloaded Feb. 3, 2025.

Miller, Graeme. "Advances in Design of Copper-Cobalt Hydrometallurgical Circuits: Copper Circuits." Copper Cobalt Africa—9th Base Metals Conference 2018. vol. 9. 2018. (Year: 2018).

Zhang, Yan-sheng, and W. A. N. G. Jun. "Simulated small-scale pilot heap leaching of low-grade copper sulfide ore with selective extraction of copper." Transactions of Nonferrous Metals Society of China 18.6 (2008): 1463-1467. (Year: 2008).

* cited by examiner

CEMENT PRODUCTION SYSTEM AND PROCESS POWERED BY GEOTHERMAL ENERGY

TECHNICAL FIELD

The present disclosure relates generally to geothermal systems and related methods and more particularly to a cement production system and process powered by geothermal energy.

BACKGROUND

Cement is a binder used in a range of construction processes. While efforts are underway to develop more environmentally friendly cement formulations, the processes used to produce cement still require large amounts of energy. Renewable energy sources, such as solar power and wind power, can be unreliable and have relatively low power densities, such that they may be insufficient to reliably power cement production processes. As such, currently available cement production technology relies heavily on non-renewable energy sources for power.

SUMMARY

This disclosure recognizes the previously unidentified and unmet need for a reliable renewable energy source for cement production. This disclosure provides a solution to this unmet need in the form of cement production systems and methods that obtain heat and/or power from geothermal energy. A geothermal system harnesses heat from a geothermal resource, such as magma, with a sufficiently high temperature that can be used to provide necessary operating temperatures and power equipment used to produce cement. For example, a heated fluid, such as steam, may be obtained from a geothermal system, and the heated fluid may be used to heat a kiln used to produce cement. In some cases, cooling may be desirable for certain processes, such as to cool the clinker formed in the kiln. An absorption chiller or other thermally powered chiller may use heated fluid from the geothermal system to provide such cooling. As yet another example, a motor that is powered by geothermal energy may power equipment, such as fluid pumps, fluid mixers, or the like, that are used in the cement production process. In some cases, one or more turbines may be powered by the heated fluid to provide electricity for some or all electronic components of the cement production system (e.g., electronic controllers, sensors, etc.).

In some cases, the systems and methods of this disclosure include capturing carbon from byproducts of the cement production process. This carbon can be removed as carbon dioxide and provided back to the cement production process, such that at least a portion of the captured carbon is incorporated into the cement that is produced. In some cases, the carbon capture systems and methods are powered at least partially by geothermal energy. For example, the geothermal system may harness heat from the geothermal resource, and the heat may be used to provide necessary operating temperatures and power equipment used for carbon dioxide capture. For example, a heated fluid, such as steam, may be obtained from the geothermal system, and the heated fluid may be used to drive processes involved in carbon capture. For example, a carbon-capture medium may need to be heated to remove captured carbon dioxide and/or regenerate the materials used to capture carbon dioxide. This heating may be provided by the heated fluid obtained from the geothermal system. In some cases, cooling may be desirable for certain processes. An absorption chiller may use heated fluid from the geothermal system to provide such cooling. In some cases, temperature adjustments or control may be achieved using heated fluid from the geothermal system and/or cooling from a geothermally powered absorption chiller. In this way, for example, carbon capture can be improved by operating at a temperature that facilitates more effective carbon dioxide capture. More generally, reaction conditions can be adjusted to improve carbon capture and regenerate carbon capture materials using hot or cold fluid obtained via geothermal energy with limited or no use of other energy inputs. As yet another example, a motor that is powered by geothermal energy may power equipment, such as fluid pumps, fluid mixers, or the like, that are used in the carbon capture process. In some cases, one or more turbines may be powered by the heated fluid to provide electricity for some or all electronic components of the carbon capture system (e.g., electronic controllers, sensors, etc.).

In some embodiments, the geothermal system used in the cement production system is a closed geothermal system that exchanges heat with an underground geothermal reservoir. The geothermal reservoir may be magma. A closed heat-transfer loop is employed in which a heat transfer fluid is pumped into the wellbore, heated via contact with the underground thermal reservoir, and returned to the surface to facilitate various processes involved in cement production. An underground geothermal reservoir, such as a magma reservoir, may facilitate the generation of high-temperature, high-pressure steam (or another high temperature fluid), while avoiding problems and limitations associated with previous geothermal technology.

The geothermal system of this disclosure may harness a geothermal resource with sufficiently high amounts of energy from magmatic activity such that the geothermal resource does not degrade significantly over time. This disclosure illustrates improved systems and methods for capturing energy from magma reservoirs, including dikes, sills, and other magmatic formations, that are significantly higher in temperature than heat sources that are accessed using previous geothermal technologies and that can contain an order of magnitude higher energy density than the geothermal fluids that power previous geothermal technologies. In some cases, the present disclosure can significantly decrease cement production costs and/or reliance on non-renewable resources for cement production. In some cases, the present disclosure may facilitate more efficient cement production both in general and in regions where access to reliable power is currently unavailable or transport of non-renewable fuels is challenging.

Certain embodiments may include none, some, or all of the above technical advantages. One or more technical advantages may be readily apparent to one skilled in the art from figures, description, and claims included herein.

BRIEF DESCRIPTION OF THE FIGURES

For a more complete understanding of the present disclosure, reference is now made to the following description, taken in conjunction with the accompanying drawings and detailed description, in which like reference numerals represent like parts.

DETAILED DESCRIPTION

Embodiments of the present disclosure and its advantages will become apparent from the following detailed description when considered in conjunction with the accompanying figures. In the figures, each identical, or substantially similar component that is illustrated in various figures is represented by a single numeral or notation. For purposes of clarity, not every component is labeled in every figure, nor is every component of each embodiment shown where illustration is not necessary to allow those of ordinary skill in the art to understand the disclosure.

As used herein, “magma” refers to extremely hot liquid and semi-liquid rock under the Earth’s surface. Magma is formed from molten or semi-molten rock mixture found typically between 1 km to 10 km under the surface of the Earth. As used herein, “heat transfer fluid” refers to a fluid, e.g., a gas or liquid, that takes part in heat transfer by serving as an intermediary in cooling on one side of a process, transporting and storing thermal energy, and heating on another side of a process. Heat transfer fluids are used in processes requiring heating or cooling.

Figure 1:
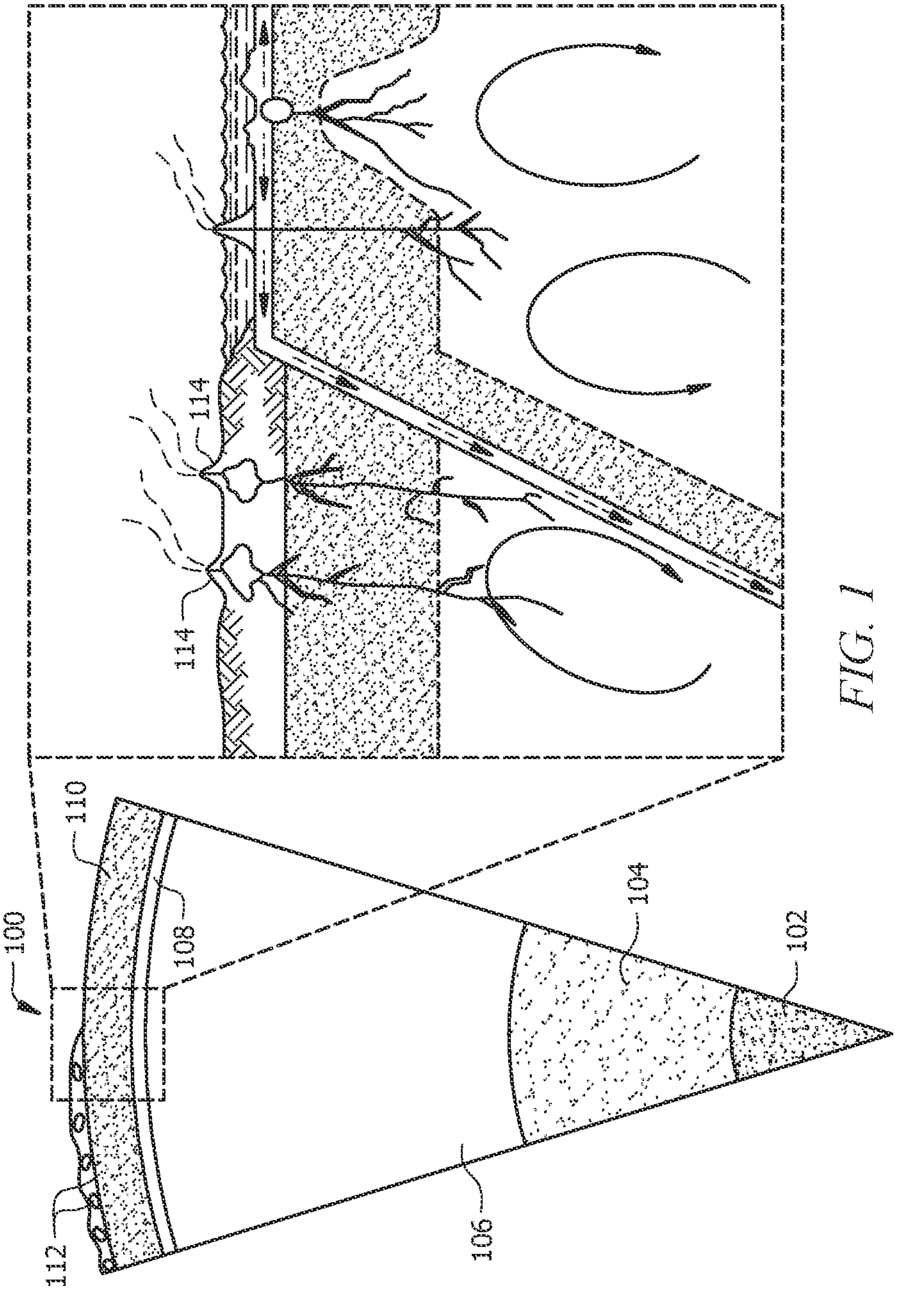
FIG. 1 is a diagram of underground regions in the Earth.

FIG. 1 is a partial cross-sectional diagram of the Earth depicting underground formations that can be tapped by geothermal systems of this disclosure (e.g., for generating geothermal power). The Earth is composed of an inner core 102, outer core 104, lower mantle 106, transitional region 108, upper mantle 110, and crust 112. There are places on the Earth where magma reaches the surface of the crust 112 forming volcanoes 114. Magma can heat ground water to temperatures sufficient for certain geothermal power production. However, for other applications, such as geothermal energy production, more direct heat transfer with the magma is desirable.

Figure 2:
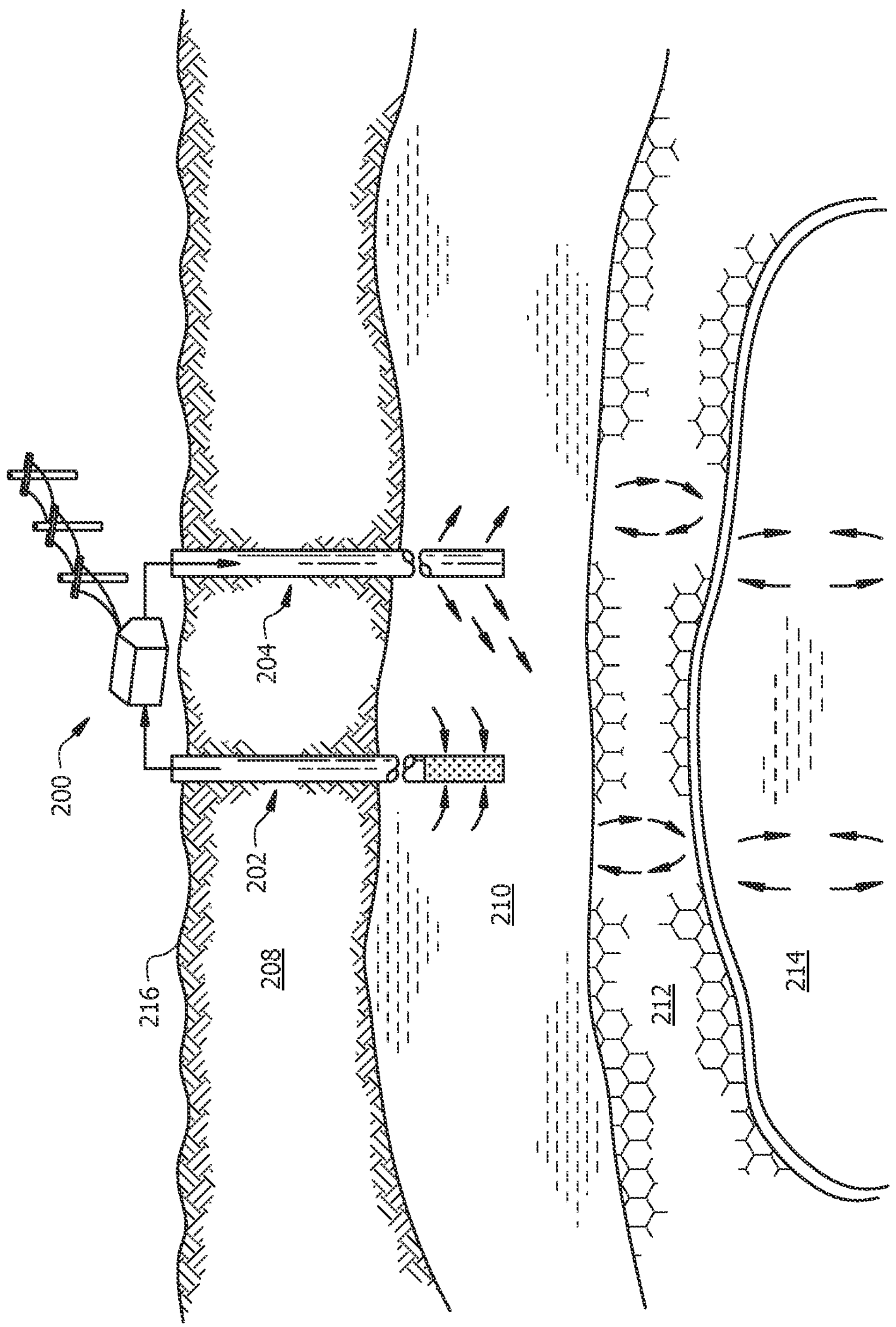
FIG. 2 is a diagram of a previous geothermal system.

FIG. 2 illustrates a conventional geothermal power generation system 200 that harnesses energy from heated ground water. The geothermal system 200 is a “flash-plant” that generates power from high-temperature, high-pressure geothermal water extracted from a production well 202. The production well 202 is drilled through rock layer 208 and into the hydrothermal layer 210 that serves as the source of geothermal water. The geothermal water is heated indirectly via heat transfer with intermediate layer 212, which is in turn heated by magma reservoir 214. Magma reservoir 214 can be any underground region containing magma such as a dike, sill, or the like. Convective heat transfer (illustrated by the arrows indicating that hotter fluids rise to the upper portions of their respective layers before cooling and sinking, then rising again) may facilitate heat transfer between these layers. Geothermal water from layer 210 flows to the surface 216 and is used for geothermal power generation. The geothermal water (and possibly additional water or other fluids) is then injected back into layer 210 via injection well 204.

The configuration of conventional geothermal system 200 of FIG. 2 suffers from drawbacks and disadvantages, as recognized by this disclosure. For example, because geothermal water is a multicomponent mixture (i.e., not pure water), the geothermal water flashes at various points along its path up to the surface 216, creating water hammer, which results in a large amount of noise and potential damage to system components. The geothermal water is also prone to causing scaling and corrosion of system components. Chemicals may be added to partially mitigate these issues, but this may result in considerable increases in operational costs and increased environmental impacts, since these chemicals are generally introduced into the environment via injection well 204.

Example Improved Geothermal System

Figure 3:
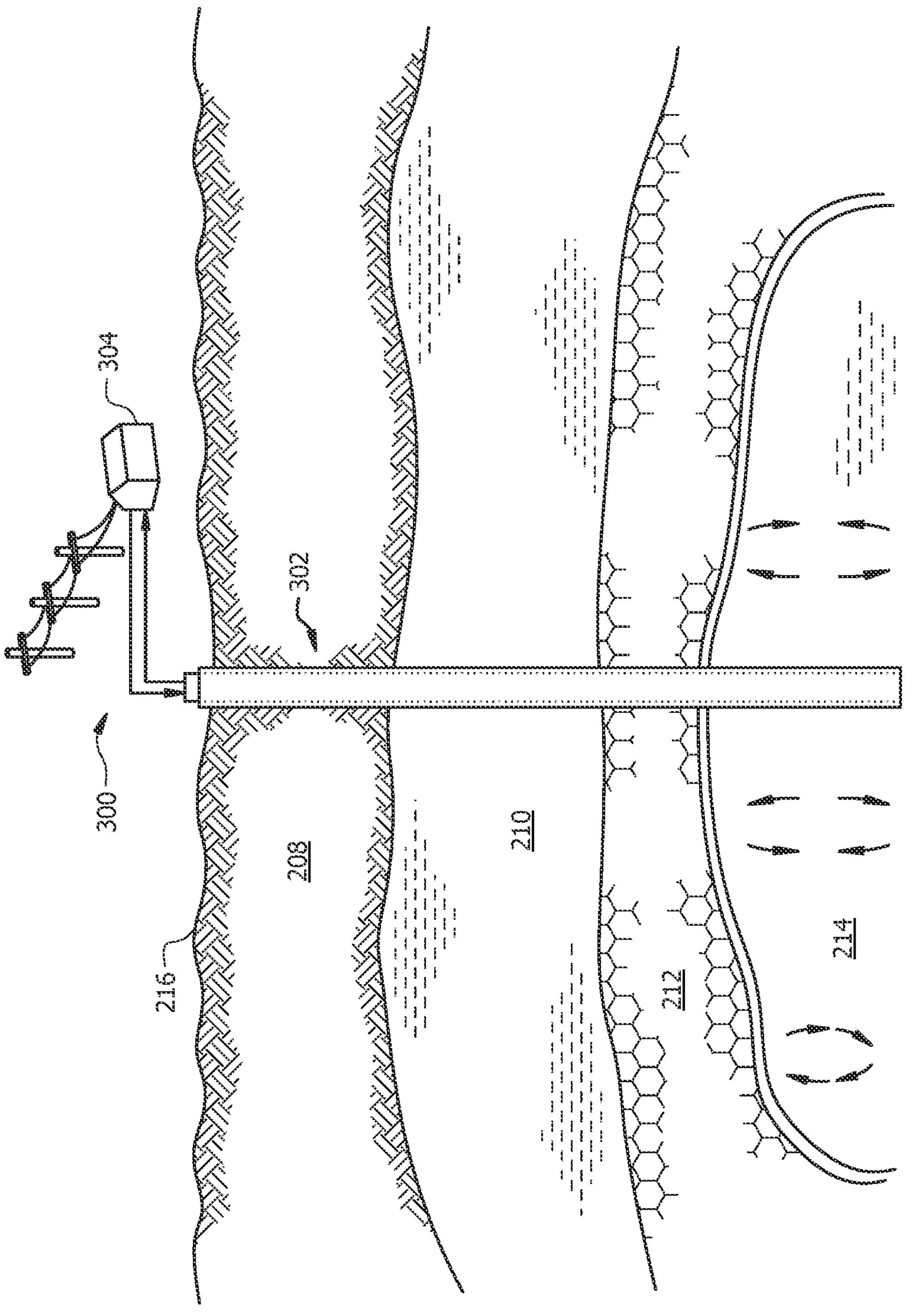
FIG. 3 is a diagram of an example improved geothermal system of this disclosure.

FIG. 3 illustrates an example magma-based geothermal system 300 that can be achieved using the systems and processes of this disclosure. The geothermal system 300 includes a wellbore 302 that extends from the surface 216 at least partially into the magma reservoir 214. The geothermal system 300 is a closed system in which a heat transfer fluid is provided down the wellbore 302 to be heated and returned to a thermal or heat-driven process system 304 (e.g., for power generation and/or any other thermal processes of interest). As such, geothermal water is not extracted from the Earth, resulting in significantly reduced risks associated with the conventional geothermal system 200 of FIG. 2, as described further below. Heated heat transfer fluid is provided to the thermal process system 304. The thermal process system 304 is generally any system that uses the heat transfer fluid to drive a process of interest. For example, the thermal process system 304 may include an electricity generation system and/or support thermal processes requiring higher temperatures/pressures than could be reliably or efficiently obtained using previous geothermal technology, such as the system 200 of FIG. 2. Further details of components of an example thermal process system 304 are provided with respect to FIG. 8 below.

The geothermal system 300 provides technical advantages over previous geothermal systems, such as the conventional geothermal system 200 of FIG. 2. The geothermal system 300 can achieve higher temperatures and pressures for increased energy generation (and/or for more effectively driving other thermal processes). For example, because of the high energy density of magma in magma reservoir 214 (e.g., compared to that of geothermal water of layer 210), a single wellbore 302 can generally create the power of many wells of the conventional geothermal system 200 of FIG. 2. Furthermore, the geothermal system 300 has little or no risk of thermal shock-induced seismicity, which might be attributed to the injection of cooler water into a hot geothermal zone, as is performed using the previous geothermal system 200 of FIG. 2.

Furthermore, the heat transfer fluid is generally not substantially released into the geothermal zone by geothermal system 300, resulting in a decreased environmental impact and decreased use of costly materials (e.g., chemical additives that are used and introduced to the environment in great quantities during some conventional geothermal operations). The geothermal system 300 may also have a simplified design and operation compared to those of previous systems. For instance, fewer components and reduced complexity may be needed at the thermal process system 304 because only clean heat transfer fluid (e.g., steam) reaches the surface 216. There may be no need or a reduced need to separate out solids or other impurities that are common to geothermal water. The example geothermal system 300 may include further components not illustrated in FIG. 3.

Further details and examples of different configurations of geothermal systems and methods of their preparation and operation are described in U.S. patent application Ser. No. 18/099,499, filed Jan. 20, 2023, and titled "Geothermal Power from Superhot Geothermal Fluid and Magma Reservoirs"; U.S. patent application Ser. No. 18/099,509, filed Jan. 20, 2023, and titled "Geothermal Power from Superhot Geothermal Fluid and Magma Reservoirs"; U.S. patent application Ser. No. 18/099,514, filed Jan. 20, 2023, and titled "Geothermal Power from Superhot Geothermal Fluid and Magma Reservoirs"; U.S. patent application Ser. No. 18/099,518, filed Jan. 20, 2023, and titled "Geothermal Power from Superhot Geothermal Fluid and Magma Reservoirs"; U.S. patent application Ser. No. 18/105,674, filed Feb. 3, 2023, and titled "Wellbore for Extracting Heat from Magma Chambers"; U.S. patent application Ser. No. 18/116,693, filed Mar. 2, 2023, and titled "Geothermal systems and methods with an underground magma chamber"; U.S. patent application Ser. No. 18/116,697, filed Mar. 2, 2023, and titled "Method and system for preparing a geothermal system with a magma chamber"; and U.S. Provisional Patent Application No. 63/444,703, filed Feb. 10, 2023, and titled "Geothermal systems and methods using energy from underground magma reservoirs", the entirety of each of which is hereby incorporated by reference.

Geothermally Powered Cement Production System

Figure 4:
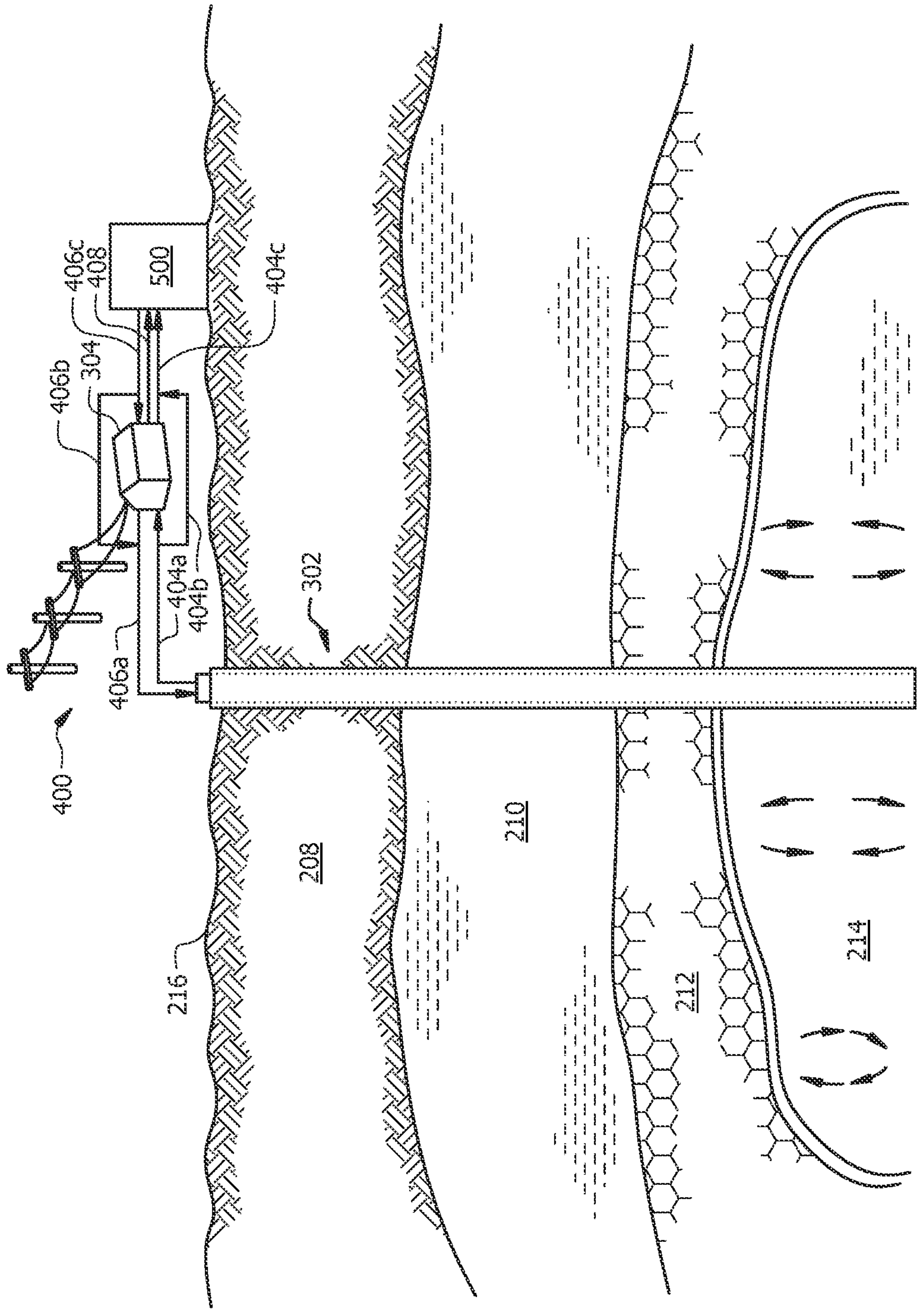
FIG. 4 is a diagram of an example cement production system powered by the geothermal system of FIG. 3.

FIG. 4 illustrates an example combined geothermal and cement production system 400 of this disclosure. The combined geothermal and cement production system 400 includes all or a portion of the components of the magma-based geothermal system 300 described above with respect to FIG. 3 as well as geothermally powered cement production system 500 for producing cement. An example of the geothermally powered cement production system 500 is described in greater detail below with respect to FIG. 5. The combined geothermal and cement production system 400 may include all or a portion of the thermal process system 304. In operation, heat transfer fluid is injected into the wellbore 302, which extends from the surface 216 into the magma reservoir 214 underground. The heated heat transfer fluid can be conveyed to the thermal process system 304 as heat transfer fluid 404*a* that can be used to drive processes, such as the generation of electricity 408 by turbines 804 and 808 in FIG. 8. Heat transfer fluid 404*a* may be referred to in the alternative as a stream of heat transfer fluid 404*a*. Heat transfer fluid 404*c*, which can be formed from any remaining amount of heat transfer fluid 404*a* (e.g., steam) exiting from the thermal process system 304 and/or the wellbore bypass stream, i.e., heat transfer fluid 404*b*, is provided to the geothermally powered cement production system 500. The electricity 408 may be used in addition to or in place of heat transfer fluid 404*c* for powering electrical and mechanical processes in the geothermally powered cement production system 500.

As described in greater detail below with respect to FIG. 5, the geothermally powered cement production system 500 uses the heat transfer fluid 404*c* to drive processes for producing cement. For example, heated heat transfer fluid 404*c* heated through heat transfer with the underground magma reservoir 214 may be used to process an ore to produce cement.

Heat transfer fluid (e.g., condensed steam) that is cooled and/or decreased in pressure after powering the geothermally powered cement production system 500 may be returned to the wellbore 302 as heat transfer fluid 406*a*. For instance, as shown in the example of FIG. 4, a stream of return heat transfer fluid 406*c* may be provided back to the thermal process system 304, used to drive one or more reactions or processes, and then expelled as heat transfer fluid 406*a* for return to the wellbore 302. The heat transfer fluid 406*a* can also include a bypass stream of heat transfer fluid 406*b*, which can be formed from heat transfer fluid 406*c*, in whole or in part. Restated, thermally processed return stream of heat transfer fluid 406*a* includes heat transfer fluid (e.g., condensed steam) from the thermal process system 304 and/or the bypass stream of heat transfer fluid 406*b*. Thermally processed return stream of heat transfer fluid 406*a* that is sent back to the wellbore 302 may be water (or another heat transfer fluid), while the stream of heat transfer fluid 404*a* received from the wellbore 302 is steam (or another heat transfer fluid at an elevated temperature and/or pressure). While the example of FIG. 4 includes the thermal process system 304 of FIG. 3, in some cases, the combined geothermal and cement production system 400 may exclude all or a portion of the thermal process system 304. For example, the wellbore stream of heat transfer fluid 404*a* from the wellbore 302 may be provided directly to the geothermally powered cement production system 500 (see wellbore bypass stream of heat transfer fluid 404*b* described above).

Streams of heat transfer fluid 404*a-c* and 406*a-c* may be any appropriate fluid for absorbing heat within the wellbore 302 and driving operations of the geothermally powered cement production system 500 and, optionally the thermal process system 304. For example, the heat transfer fluid may include water, a brine solution, one or more refrigerants, a thermal oil (e.g., a natural or synthetic oil), a silicon-based fluid, a molten salt, a molten metal, or a nanofluid (e.g., a carrier fluid containing nanoparticles). A molten salt is a salt that is a liquid at the high operating temperatures experienced in the wellbore 302 (e.g., at temperatures between 1,600 and 2,300° F.). In some cases, an ionic liquid may be used as the heat transfer fluid. An ionic liquid is a salt that remains a liquid at more modest temperatures (e.g., at or near room temperature). In some cases, a nanofluid may be used as the heat transfer fluid. The nanofluid may be a molten salt or ionic liquid with nanoparticles, such as graphene nanoparticles, dispersed in the fluid. Nanoparticles have at least one dimension of 100 nanometers (nm) or less. The nanoparticles increase the thermal conductivity of the molten salt or ionic liquid carrier fluid. This disclosure recognizes that molten salts, ionic liquids, and nanofluids can provide improved performance as heat transfer fluids in the wellbore 302. For example, molten salts and/or ionic liquids may be stable at the high temperatures that can be reached in the wellbore 302. The high temperatures that can be achieved by these materials not only facilitate increased energy extraction but also can drive thermal processes that were previously inaccessible using previous geothermal technology. The heat transfer fluid may be selected at least in part to limit the extent of corrosion of surfaces of the combined geothermal and cement production system 400. As an example, the heat transfer fluid may be water. The water is supplied to the wellbore 302 as stream of heat transfer fluid 406*a* in the liquid phase and is transformed into steam within the wellbore 302. The steam is received as stream of heat transfer fluid 404*a* and used to drive the geothermally powered cement production system 500.

Example Geothermally Powered Cement Production System

Figure 5:
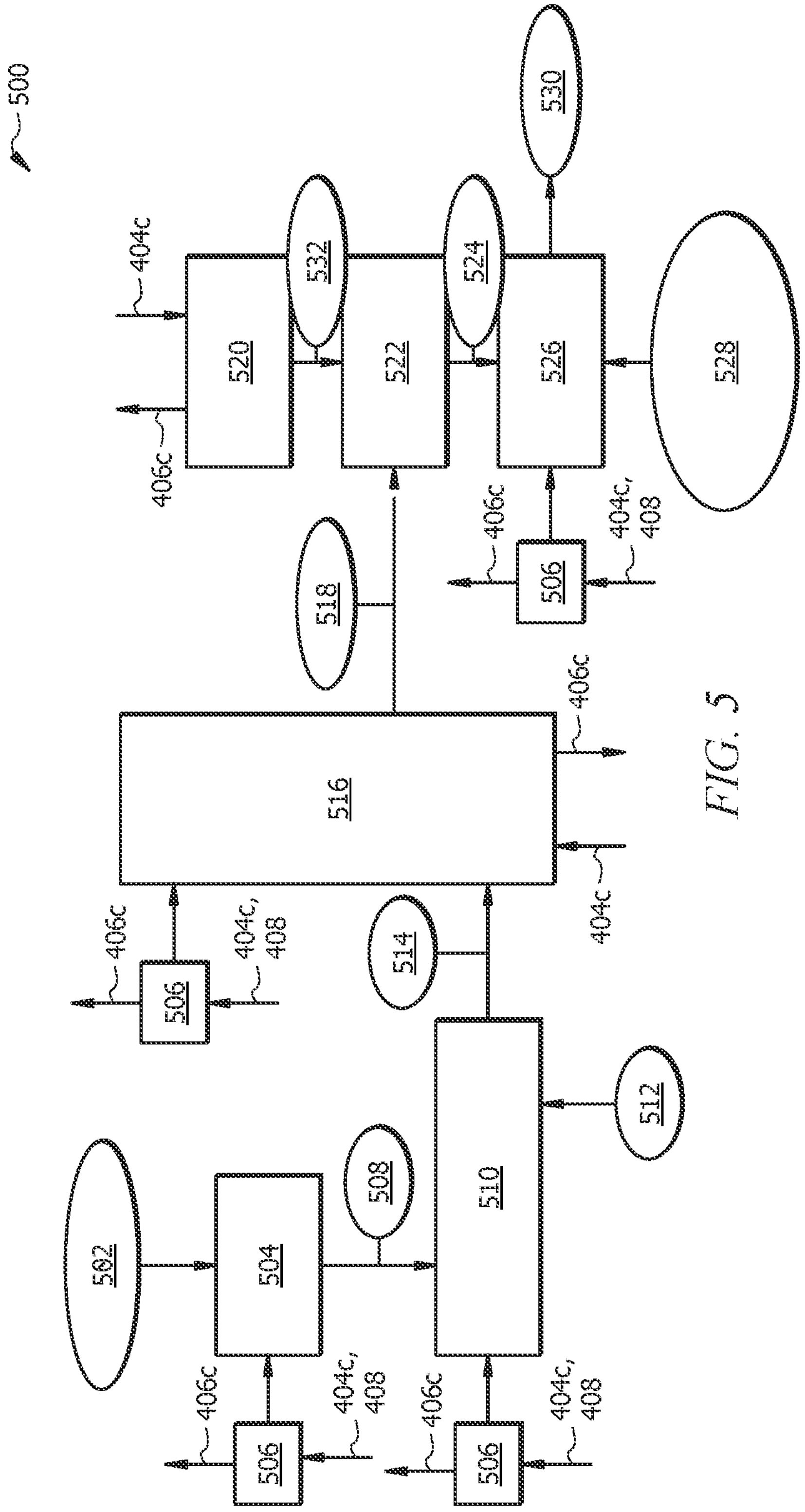
FIG. 5 is a diagram of an example geothermally powered cement production system of FIG. 4 in greater detail.

FIG. 5 shows an example geothermally powered cement production system 500 in greater detail when operated to produce cement 530. The configuration of FIG. 5 is provided as an example only. The geothermally powered cement production system 500 may include more or fewer components, and the components may be arranged in different configurations in order to produce cement 530. The geothermally powered cement production system 500 includes a crusher 504; one or more optional geothermally powered motors 506; a mixing, grinding, and blending subsystem 510; a geothermally powered kiln 516; a cooler 522; and a mill 526.

The geothermally powered cement production system 500 receives raw material 502. As an example, the raw material 502 may be limestone, marl, and/or clay. More generally the raw material 502 may be any starting material, such as a rock from an appropriate quarry, that can be used as a precursor for producing cement 530.

The crusher 504 crushes the received raw material 502. The crusher 504 breaks the raw material 502 into a manageable size for subsequent operations performed by the geothermally powered cement production system 500. The crusher 504 may be a jaw crusher, gyratory crusher, cone crusher, impact crusher, or any other appropriate type of crusher. A motor 506 powered by geothermal energy may be used to perform operations of the crusher 504. For example, motor 506 may be powered by geothermal energy obtained from the wellbore 302. For example, steam or another heated heat transfer fluid 404*c* from the wellbore 302 may drive movement of a geothermally powered motor that is used to cause movement of crushing components of the crusher 504. Examples of such geothermally powered motors are described in U.S. Provisional Application No. 63/448,929, filed Feb. 28, 2023, and titled "Drilling equipment powered by geothermal energy", the contents of which are incorporated herein by reference in their entirety. In some cases, electricity 408 generated using steam from the wellbore 302 may be used to power motor 506.

The crushed raw material 508 from the crusher 504 is provided to the mixing, grinding, and blending subsystem 510. The mixing, grinding, and blending subsystem 510 subsystem includes one or more vessels and associated components to combine the crushed raw material 508 with other components 512 included in the cement precursor 514 and grind the materials to form the cement precursor 514. For example, the other components 512 may include shale, clay, slate, blast-furnace slag, silica sand, iron ore, and/or the like. The mixing, grinding, and blending subsystem 510 may include a roller mill or anther appropriate mill for performing operation of the mixing, grinding, and blending subsystem 510. Similarly to as described above with respect to the crusher 504, a motor 506 powered by geothermal energy may be used to perform operations of the mixing, grinding, and blending subsystem 510.

The kiln 516 heats the cement precursor 514 to an elevated temperature (e.g., of about 2000° C.) to sinter the cement precursor 514 and form a clinker 518. The kiln 516 may include a preheater tower to preheat the precursors 514 before it enters the kiln 516. The kiln 516 may be a rotary kiln or any other appropriate type of kiln. The kiln 516 is at least partially heated using the heat transfer fluid 404*c*. A fuel may also be provided to the kiln 516 to support the production of a high temperature flame that aids in preparing the clinker 518. Movable parts of the kiln 516 may be driven by a motor 506 that is powered by geothermal energy, as described above with respect to the crusher 504.

Figure 6A:
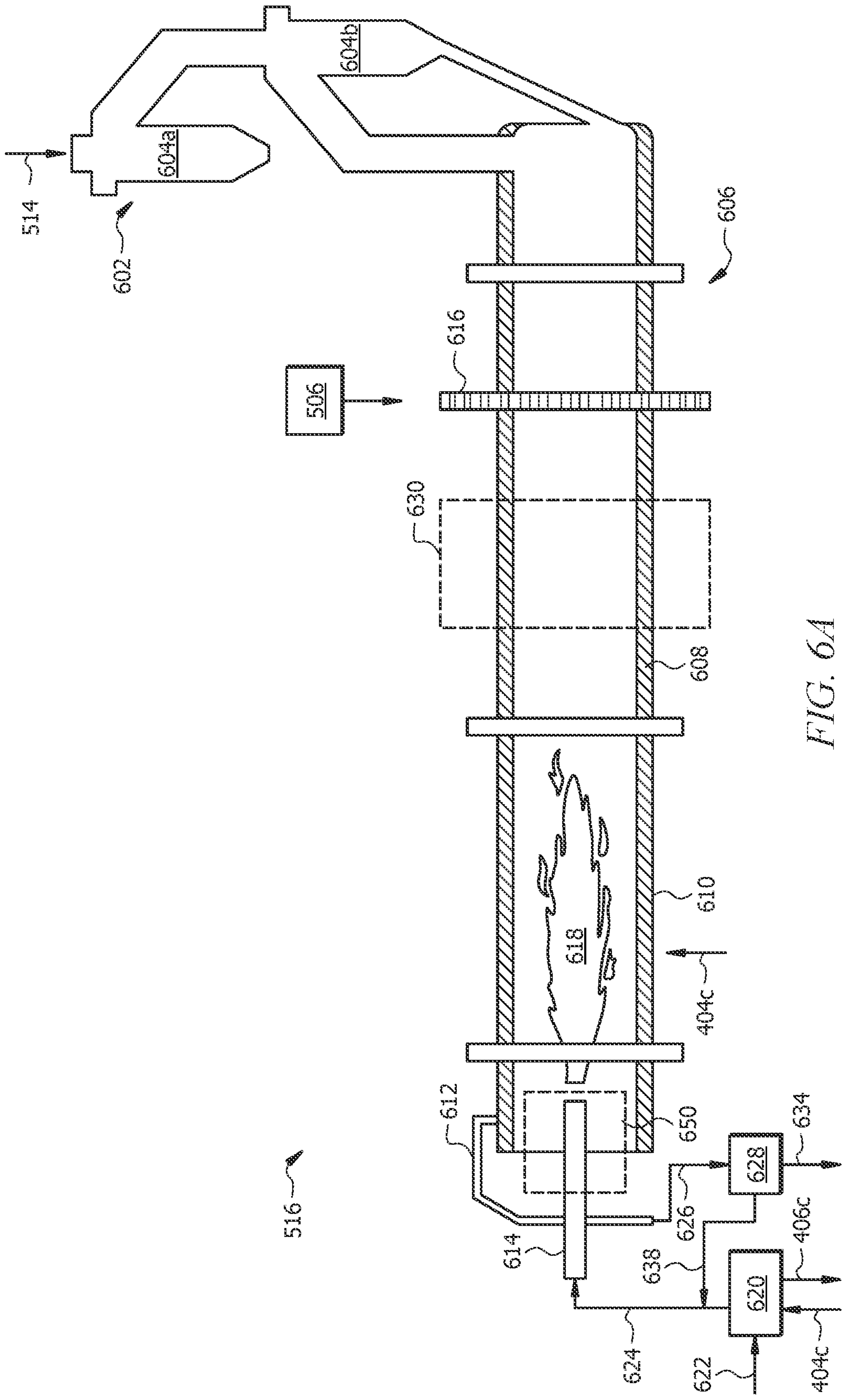
FIG. 6A is a diagram of an example geothermally powered kiln of the system of FIG. 5.
Figure 6B:
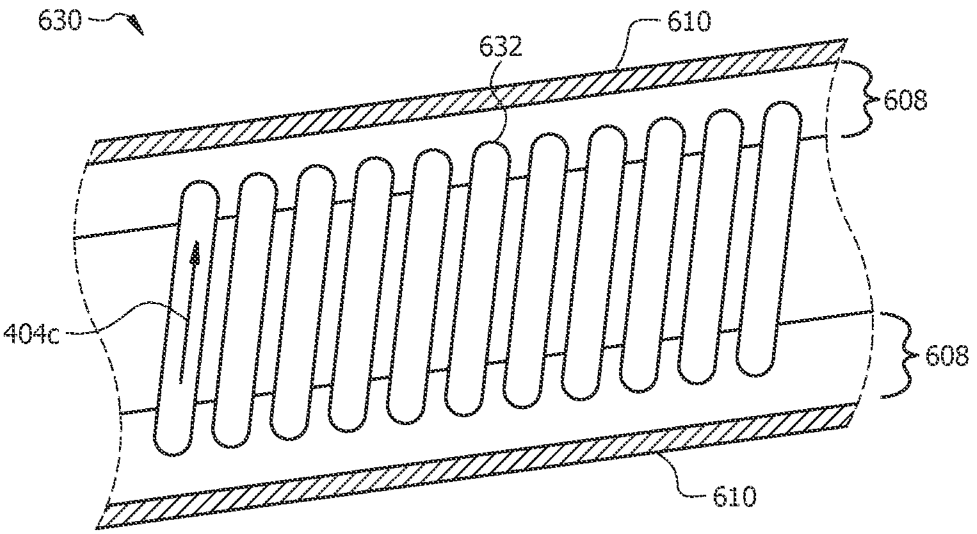
FIG. 6B is a diagram of region 630 of FIG. 6A in greater detail.
Figure 6C:
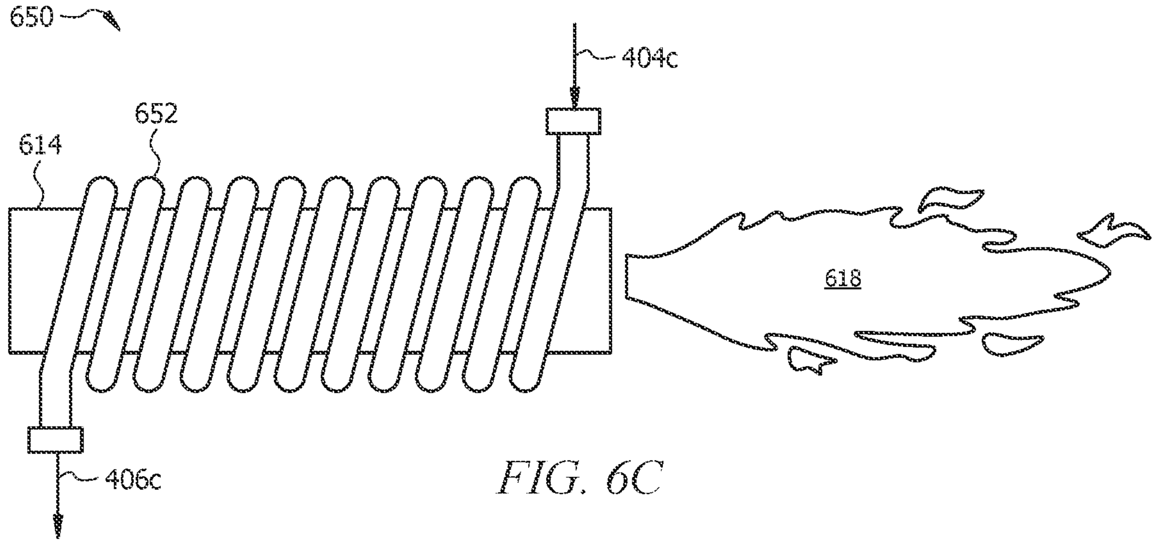
FIG. 6C is a diagram of region 650 of FIG. 6A in greater detail.

An example kiln 516 is illustrated in greater detail in FIGS. 6A-6C. Turning to FIG. 6A, the example kiln 516 illustrated includes a preheating tower 602 that leads to a rotary kiln 606. The preheating tower 602 receives cement precursor 514 and directs this material into the rotary kiln 606 while also preheating this material. The preheating tower 602 may include a number of stages 604*a, b* that are preheated using heat transfer fluid 404*c*.

The rotary kiln 606 rotates and heats the preheated cement precursor. A flame 618 established in the rotary kiln 606 sinters the preheated cement precursor. The resulting clinker is directed toward subsequent components of the geothermally powered cement production system 500 (see FIG. 5).

The rotary kiln 606 includes an internal lining 608. The internal lining 608 may be made of brick or another material that can withstand the high temperature inside the rotary kiln 606. An outer shell 610 is located on the outer surface of the internal lining 608. The outer shell 610 may be made of steel or a similar material. In some cases a heat exchanger is disposed on a surface of the internal lining 608 or at least partially embedded within the internal lining 608 to facilitate heat transfer into the rotary kiln 606. FIG. 6B shows an example of such a heat exchanger 632 in a detailed view of region 630 of FIG. 6A. The heat exchanger 632 includes a coil that allows the flow of heat transfer fluid 404*c*. The flow of heat transfer fluid 404*c* heats the interior of rotary kiln 606 of FIG. 6A, thereby heating the cement precursor inside. The coil heat exchanger 632 may be on the interior surface of the internal lining 608 or may be embedded within the internal lining 608, as shown in the example of FIG. 6B. The use of heat exchanger 632 may allow the rotary kiln 606 to operate more efficiently than if the flame 618 of FIG. 6A were used as the only heat source.

Returning to FIG. 6A, a burner pipe 614 allows transport of a fuel (e.g., a flammable material) into the rotary kiln 606. The fuel may be a hydrocarbon and/or oxygen. The amount of fuel needed to reach a sufficient temperature for sintering the cement precursor may be significantly reduced through the use of the heat transfer fluid 404*c* for heating, as described in this disclosure. The fuel is increased in temperature sufficiently or a spark is provided to obtain a flame 618. The flame 618 facilitates the sintering of the cement precursor within the rotary kiln 606. In some cases, a heat exchanger is positioned on or near (e.g., adjacent to) the burner pipe to heat the fuel as it exits the burner pipe 614. FIG. 6C shows an example of such a heat exchanger 652 in an expanded view of region 650 of FIG. 6A. The heat exchanger 652 includes a coil that allows the flow of heat transfer fluid 404*c*. The flow of heat transfer fluid 404*c* heats the burner pipe 614, thereby heating the fuel provided to the rotary kiln 606. The heat exchanger 652 may be on the surface of the burner pipe 614, as shown in FIG. 6C, near the burner pipe 614, or embedded within the wall of the burner pipe 614. The use of heat exchanger 652 may allow the rotary kiln 606 to operate more efficiently.

Returning to FIG. 6A, in some cases, an air heater 620 preheats air that is supplied to the burner pipe 614. The preheated air may help facilitate fuel combustion, which in turn may help facilitate the sintering process within the rotary kiln 606. The air heater 620 receives a flow of air 622 and generates a flow of heated air 624 that is provided into the burner pipe 614, and in some embodiments the heated air 624 can also be supplied to the rotary kiln 606 via separate conduit (not show). The heated air may facilitate more efficient sintering of cement precursor in the rotary kiln 606.

A kiln hood 612 captures fumes from the rotary kiln 606. For example, gaseous byproducts (shown by arrow 626) of sintering the cement precursor may be captured by the kiln hood 612. These gaseous byproducts (arrow 626) may include carbon dioxide. In the example of FIG. 6A, the kiln 516 is coupled to a carbon capture system 628. The carbon capture system 628 captures carbon dioxide from the gaseous byproducts and provides this carbon dioxide back into the kiln 516 (e.g., via the flow shown by arrow 638 that returns via the burner pipe 614). A portion of the carbon from this carbon dioxide may be incorporated into the clinker formed in the kiln 516. The carbon capture system 628 may be powered by geothermal energy (see FIGS. 9A-9D and 10). In some cases, all or a portion of this carbon dioxide may be sent to another process or sent for storage. Byproducts with carbon dioxide at least partially removed (arrow 634) may be released to the atmosphere or otherwise further processed as appropriate. Further details of an example carbon capture system 628 and its operation are described below with respect to FIGS. 9A-9D and 10.

A drive gear 616 provides rotational movement to the rotary kiln 606. The drive gear 616 may be powered by a geothermally powered motor 506, examples of which are described above with respect to FIG. 5.

Returning to FIG. 5, the clinker 518 generated in the kiln 516 may be provided to a cooler 522. The cooler 522 cools the clinker 518 to provide a cooled clinker 524 that is sent to the mill 526 (described below). The cooler 522 may provide cooling using a cooling fluid 532 that is generated by a heat-driven chiller 520. The heat-driven chiller 520 generally uses heat transfer fluid 404*c* to generate the cooling fluid 532. For example, the heat-driven chiller 520 may be an absorption chiller or an adsorption chiller. The use of heat-driven chiller 520 provides further improvements to efficiency by facilitating cooling operations using geothermal energy and without the inefficiencies of first generating electricity and using this electricity to power more conventional cooling devices.

The mill 526 receives the cooled clinker 524 from the cooler 522. The cooled clinker 524 may be combined with other components 528 in the mill 526. For example, the other components 528 may include gypsum. Similarly to as described above with respect to the crusher 504 and other moving components of the geothermally powered cement production system 500, a motor 506 powered by geothermal energy may be used to perform operations of the mixing, grinding, and blending subsystem 510. The combination of these materials results in cement 530. Cement 530 may be in a powder state, which is convenient for transport and use at other locations.

Example Method of Operating a Geothermally Powered Carbon Capture System

Figure 7:
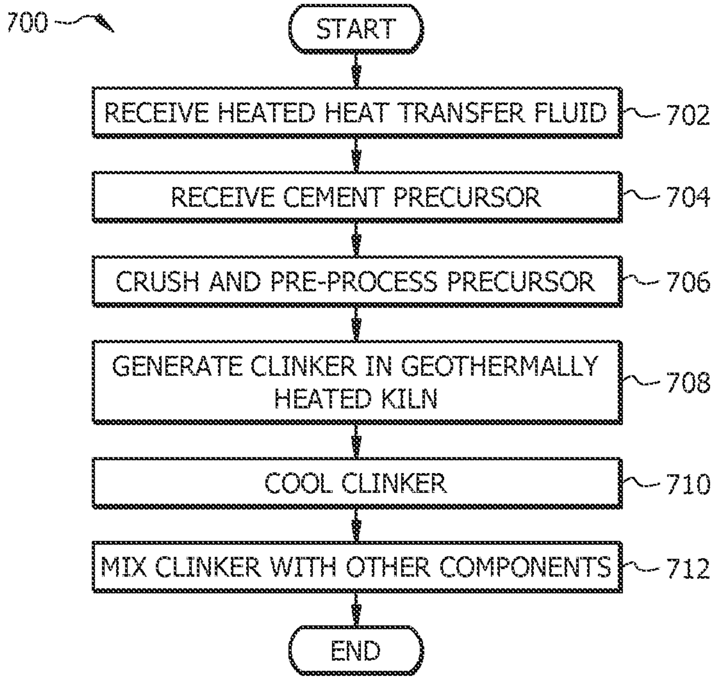
FIG. 7 is a flowchart of an example method for operating the system of FIG. 4.

FIG. 7 illustrates an example method 700 of operating the system 500 of FIG. 5. The method 700 may begin at step 702 where heated heat transfer fluid 404*c* is received. At step 704, raw material 502 is received. At step 706, the received raw material 502 is crushed and pre-processed as appropriate to generate cement precursor 514 (e.g., using the crusher 504 and mixing, grinding, and blending subsystem 510, described above). At step 708, clinker 518 is generated using the geothermally powered kiln 516 (see description of FIGS. 5 and 6A-C above). At step 710, the clinker 518 is cooled (e.g., using cooling fluid 532 from the heat-driven chiller 520 of FIG. 5). At step 712, cement 530 is produced by mixing the clinker 518 with other components 528.

Modifications, omissions, or additions may be made to method 700 depicted in FIG. 7. Method 700 may include more, fewer, or other steps. For example, at least certain steps may be performed in parallel or in any suitable order. While at times discussed as system 500 being used to perform steps, any suitable component(s) may perform or may be used to perform one or more steps of the method 700.

Example Thermal Process System

Figure 8:
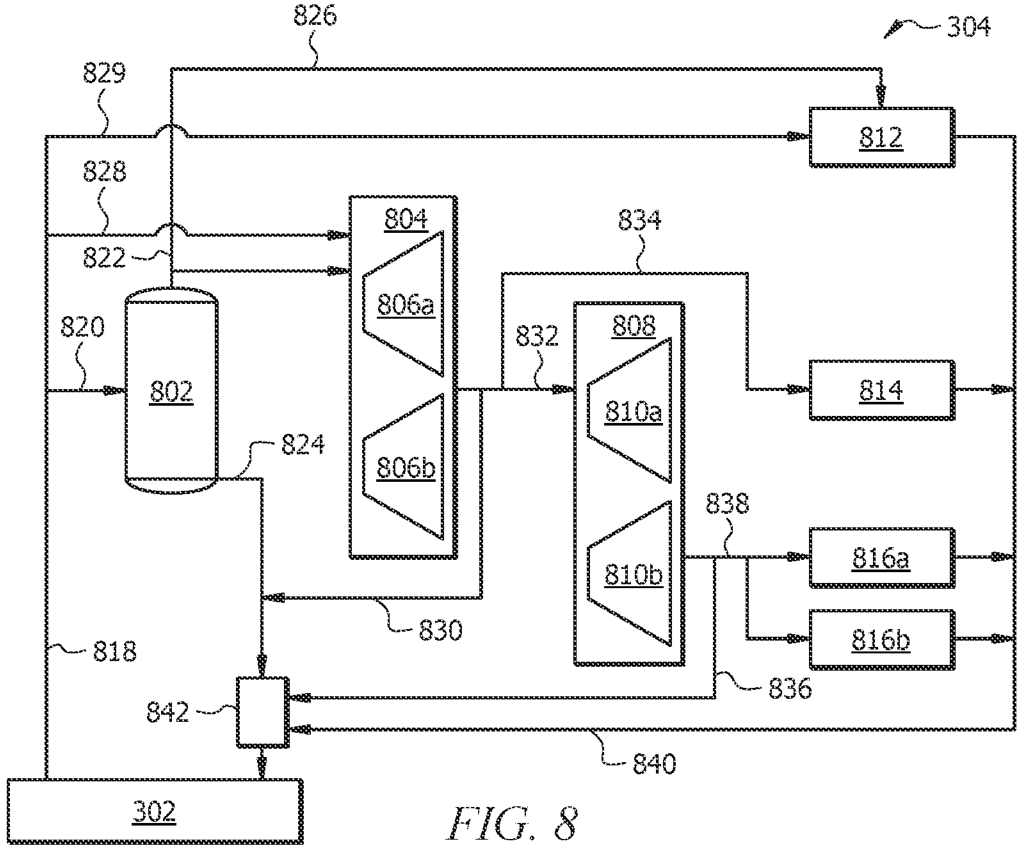
FIG. 8 is a diagram of an example system for performing thermal or heat-driven processes of FIGS. 3 and 4.

FIG. 8 shows a schematic diagram of an example thermal process system 304 of FIG. 3. The thermal process system 304 includes a steam separator 802, a first turbine set 804, a second turbine set 808, a high-temperature/pressure thermochemical process 812, a medium-temperature/pressure thermochemical process 814, one or more lower temperature/pressure processes 816*a,b*, and a condenser 842. The thermal process system 304 may include more or fewer components than are shown in the example of FIG. 8. For example, a thermal process system 304 used for power generation alone may omit the high-temperature/pressure thermochemical process 812, medium-temperature/pressure thermochemical process 814, and lower temperature/pressure processes 816*a,b*. Similarly, a thermal process system 304 that is not used for power generation may omit the turbine sets 804, 808. As a further example, if heat transfer fluid is known to be received only in the gas phase, the steam separator 802 may be omitted in some cases. The ability to tune the properties of the heat transfer fluid received from the unique wellbore 302 of FIG. 3 facilitates improved and more flexible operation of the thermal process system 304. For example, the depth of the wellbore 302, the residence time of heat transfer fluid in the wellbore 302, the pressure achieved in the wellbore 302, and the like can be selected or adjusted to provide desired heat transfer fluid properties at the thermal process system 304.

In the example of FIG. 8, the thermal process system 304 receives a stream 818 from the wellbore 302. One or more valves (not shown for conciseness) may be used to control the allocation of stream 818 within the thermal process system 304, e.g., to a steam separator 802 via stream 820, and/or to the first turbine set 804 via stream 828, and/or to the thermal process 812 via stream 829. Thus, the entirety of stream 818 can be provided to any one of streams 820, 828, or 829, or distributed equally or unequally among streams 820, 828, and 829.

The steam separator 802 is connected to the wellbore 302 that extends between the surface and the underground magma reservoir. The steam separator 802 separates a gas-phase heat transfer fluid (e.g., steam) from liquid-phase heat transfer fluid (e.g., condensate formed from the gas-phase heat transfer fluid). A stream 820 received from the wellbore 302 may be provided to the steam separator 802. A gas-phase stream 822 of heat transfer fluid from the steam separator 802 may be sent to the first turbine set 804 and/or the thermal process 812 via stream 826. The thermal process 812 may be a thermochemical reaction requiring high temperatures and/or pressures (e.g., temperatures of between 500 and 2,000° F. and/or pressures of between 1,000 and 4,500 psig). A liquid-phase stream 824 of heat transfer fluid from the steam separator 802 may be provided back to the wellbore 302 and/or to condenser 842. The condenser 842 is any appropriate type of condenser capable of condensing a vapor-phase fluid. The condenser 842 may be coupled to a cooling or refrigeration unit, such as a cooling tower (not shown for conciseness).

The first turbine set 804 includes one or more turbines 806*a,b*. In the example of FIG. 8, the first turbine set includes two turbines 806*a,b*. However, the first turbine set 804 can include any appropriate number of turbines for a given need. The turbines 806*a,b* may be any known or yet to be developed turbine for electricity generation. The turbine set 804 is connected to the steam separator 802 and is configured to generate electricity from the gas-phase heat transfer fluid (e.g., steam) received from the steam separator 802 (stream 822). A stream 830 exits the set of turbines 804. The stream 830 may be provided to the condenser 842 and then back to the wellbore 302.

If the heat transfer fluid is at a sufficiently high temperature, as may be uniquely and more efficiently possible using the wellbore 302, a stream 832 of gas-phase heat transfer fluid may exit the first turbine set 804. Stream 832 may be provided to a second turbine set 808 to generate additional electricity. The turbines 810*a,b* of the second turbine set 808 may be the same as or similar to turbines 806*a,b*, described above.

All or a portion of stream 832 may be sent as gas-phase stream 834 to a thermal process 814. Process 814 may be a process using gas-phase heat transfer fluid at or near the conditions of the heat transfer fluid exiting the first turbine set 804. For example, the thermal process 814 may include one or more thermochemical processes requiring steam or another heat transfer fluid at or near the temperature and pressure of stream 832 (e.g., temperatures of between 250 and 1,500° F. and/or pressures of between 500 and 2,000 psig). The second turbine set 808 may be referred to as "low pressure turbines" because they operate at a lower pressure than the first turbine set 804. Fluid from the second turbine set 808 is provided to the condenser 842 via stream 836 to be condensed and then sent back to the wellbore 302.

An effluent stream 838 from the second turbine set 808 may be provided to one or more thermal processes 816*a,b*. Thermal processes 816*a,b* generally require less thermal energy than processes 812 and 814, described above (e.g., processes 816*a,b* may be performed temperatures of between 22° and 700° F. and/or pressures of between 15 and 120 psig). As an example, processes 816*a,b* may include water distillation processes, heat-driven chilling processes, space heating processes, agriculture processes, aquaculture processes, and/or the like. For instance, an example heat-driven chiller process 816*a* may be implemented using one or more heat driven chillers. Heat driven chillers can be implemented, for example, in data centers, crypto-currency mining facilities, or other locations in which undesirable amounts of heat are generated. Heat driven chillers, also conventionally referred to as absorption cooling systems, use heat to create chilled water. Heat driven chillers can be designed as direct-fired, indirect-fired, and heat-recovery units. When the effluent includes low pressure steam, indirect-fired units may be preferred. An effluent stream 840 from all processes 812, 814, 816*a,b*, may be provided back to the wellbore 302.

Example Geothermally Powered Carbon Capture

Figure 9A:
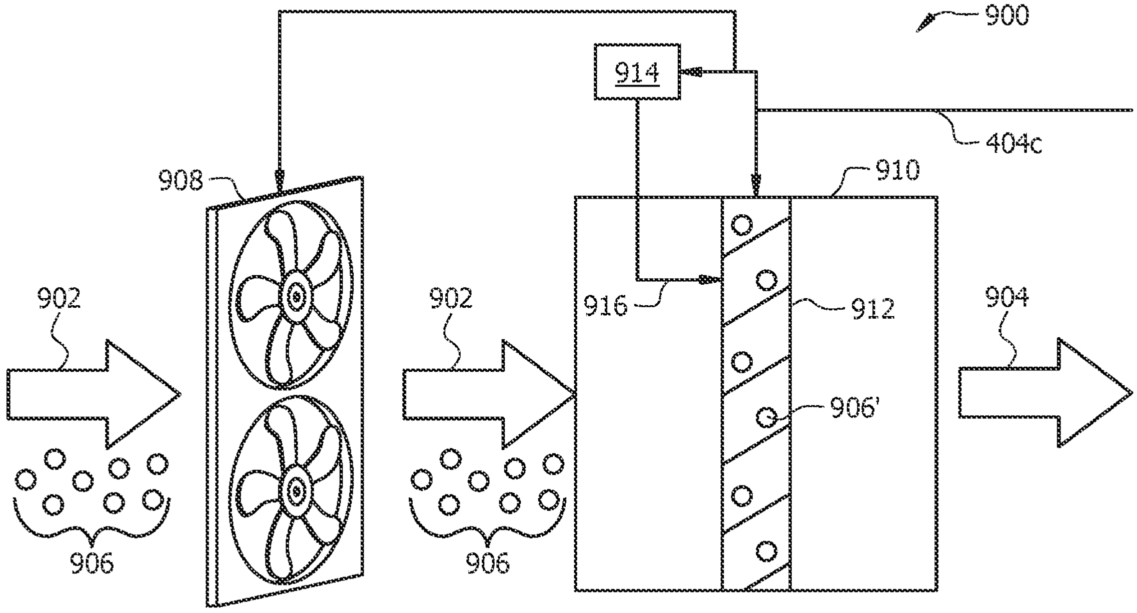
FIG. 9A is a diagram of an example carbon capture system operated in carbon capture mode.

FIG. 9A shows an example geothermally powered carbon capture system 900 that may be used as the carbon capture system 628 of FIG. 6A to capture carbon dioxide 906 from gaseous products 902. Gaseous products 902 may correspond to the byproducts shown as arrow 626 in FIG. 6A. The configuration of FIG. 9A is provided as an example only. The geothermally powered carbon capture system 900 may include more or fewer components, and the components may be arranged in different configurations in order to remove carbon dioxide 906 from flow of gaseous products 902. While this disclosure primarily describes the capture of carbon dioxide from kiln exhaust, it should be understood that the carbon capture system 900 can also or alternatively be used to capture carbon from other sources, such as air or outputs from other processes.

The geothermally powered carbon capture system 900 includes one or more fans 908 and an air contactor 910. The fan(s) 908 may be any device or combination of devices (e.g., fans, blowers, compressors) capable of moving gaseous products 902 into the air contactor 910 and back into the environment as flow of air 904. Flow of air 904 may correspond to the byproducts shown as arrow 634 in FIG. 6A. In some cases, the fan(s) 908 may be powered by geothermal energy obtained from the wellbore 302. For example, steam or another heated heat transfer fluid from the wellbore 302 may drive movement of a geothermally powered motor that is used to cause movement of the fan(s) 908. Examples of such geothermally powered motors, such as the geothermally powered motors 506 described above with respect to FIG. 5. Electricity 408 may be used to power the fan(s) 908. In this way, the carbon capture system 900 can be more efficiently operated without a separate power supply for fan(s) 908, thereby facilitating operation of the carbon capture system 900 without consuming non-renewable energy resources or relying on intermittent resources such as wind or solar.

The air contactor 910 holds a carbon-capture medium 912 (or carbon-capture material). In the example of FIG. 9A, the carbon-capture medium 912 is a filter adapted to collect carbon dioxide 906 from gaseous products 902. For example, a filter-type carbon-capture medium 912 may be an air permeable membrane that is chemically modified to include molecules that bind strongly with carbon dioxide 906 in gaseous products 902. The flow of air 904 exiting the air contactor 910 has less carbon dioxide 906 than was present in the gaseous products 902. When the carbon capture system 900 is operated in the carbon capture mode illustrated in FIG. 9A, the carbon-capture medium 912 is configured to remove carbon dioxide 906 from the flow of gaseous products 902 that enters the air contactor 910 and contacts the carbon-capture medium 912. This disclosure encompasses the use of other types of carbon-capture media (see, e.g., the example of a solution-phase carbon-capture medium in FIG. 9D).

In some cases, the carbon capture system 900 includes one or more absorption chillers 914. An absorption chiller 914 can generate a cooling fluid 916 using a heated heat transfer fluid, such as from heat transfer fluid 404*c*, or another fluid heated by heat transfer fluid 404*c*. In some cases, the cooling fluid 916 may be used to adjust the temperature of the carbon-capture medium 912 in order to improve capture of carbon dioxide 906 from gaseous products 902. For example, a given carbon-capture medium 912 may more effectively capture carbon dioxide 906 at a certain temperature or temperature range. As such, to improve carbon capture without use of intermittent or non-renewable energy consumption, the temperature in the air contactor 910 may be adjusted to a target temperature or temperature range using the cooling fluid 916 generated by the absorption chiller 914 and/or the heat transfer fluid 404*c* heated by the geothermal system. Electronic components such as temperature sensors and controllers may be powered by electricity generated using energy from wellbore 302 (see, e.g., the turbines of FIG. 8 above).

Figure 9B:
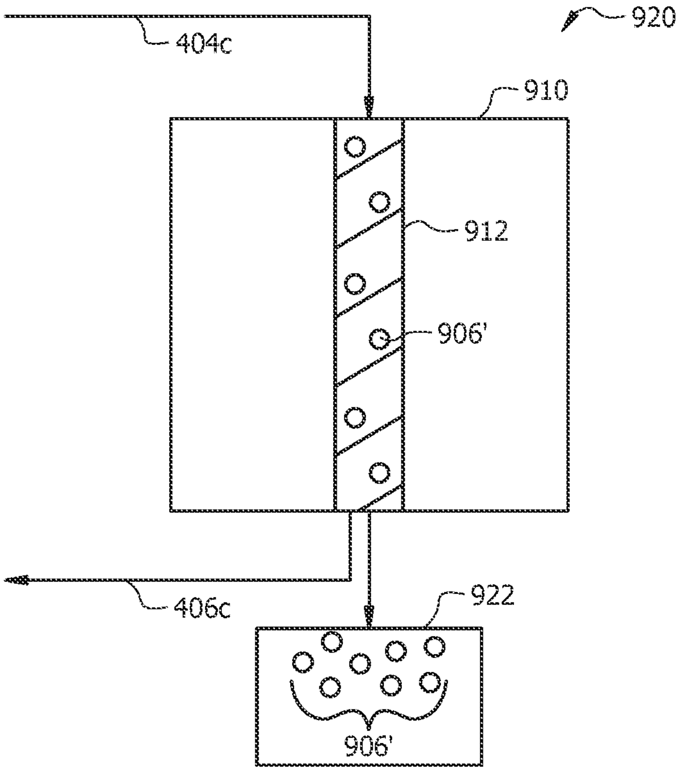
FIG. 9B is a diagram of an example carbon capture system operated in regeneration mode.
Figure 9C:
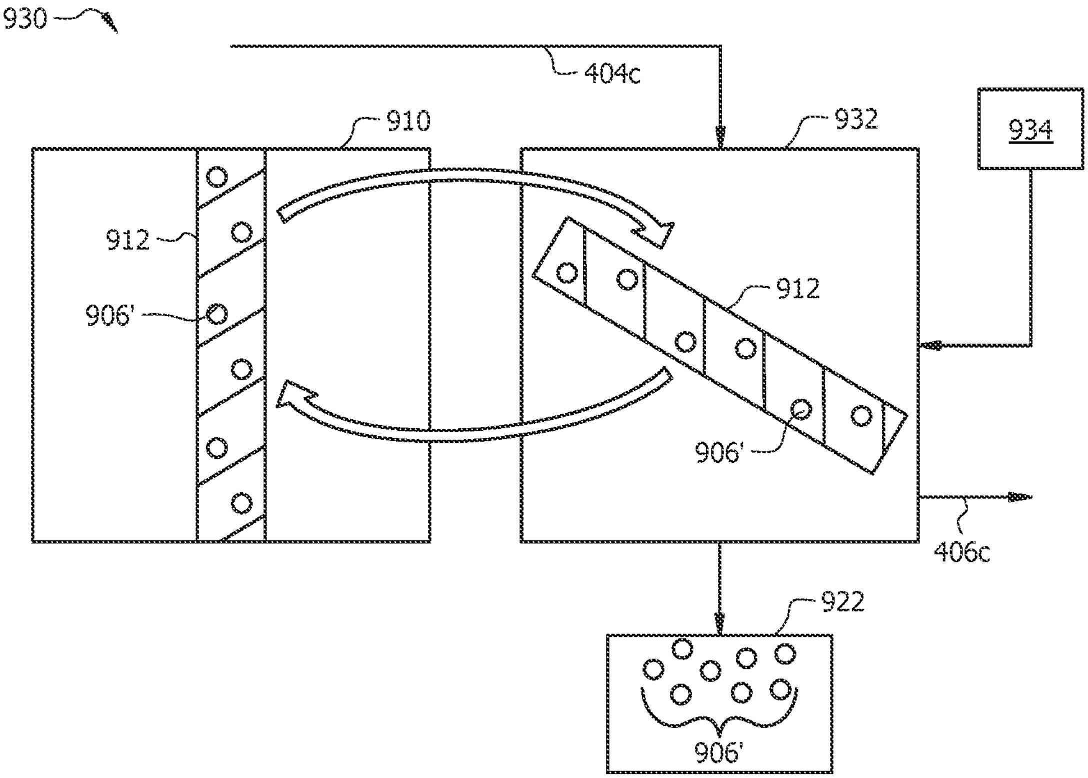
FIG. 9C is a diagram of another example carbon capture system operated in regeneration mode.

FIGS. 9B and 9C show different example configurations of the system 900 (configuration 920 of FIG. 9B and configuration 930 of FIG. 9C) for removing carbon dioxide 906' from the carbon-capture medium 912, directing the released carbon dioxide 906' into carbon storage 922 (or back to kiln 516 in the example of FIGS. 5 and 6A), and regenerating the carbon-capture medium 912. As illustrated in FIGS. 9B and 9C, the carbon capture system 900 may further include or be coupled to carbon storage 922. In the context of this disclosure, the carbon storage 922 is generally the kiln 516, such that the carbon dioxide 906 can be at least partially incorporated into the geothermally generated cement product, thereby effectively "storing" at least a portion of the captured carbon dioxide 906 in the cement product. However, the carbon storage 922 may also or alternatively include another borehole or other structure into which captured carbon dioxide 906' can be stored. For example, the captured carbon dioxide 906' may be combined with water and stored in an underground carbon storage.

In the configuration 920 of FIG. 9B, the carbon-capture medium 912 is regenerated within the air contactor 910. In this example, heat transfer fluid 404*c* is used (directly or indirectly) to increase the temperature of the carbon-capture medium 912 in order to release the captured carbon dioxide 906'. For example, when the carbon capture system 900 is operated in the regeneration mode, the temperature of the carbon-capture medium 912 may be increased using heated heat transfer fluid 404*c* or another fluid heated by the heated heat transfer fluid 404*c*, such that carbon dioxide 906' captured during operation in the carbon capture mode of FIG. 9A is released from the carbon-capture medium 912. The released carbon dioxide 906' is directed to carbon storage 922 (e.g., to the kiln 516 of FIGS. 5 and 6A).

In the configuration 930 of FIG. 9C, the carbon-capture medium 912 is moved to a separate regeneration subsystem 932. In this example, heat transfer fluid 404*c* is still used (directly or indirectly) to increase the temperature of the carbon-capture medium 912 in order to release the captured carbon dioxide 906'. One or more regeneration agents 934 may be provided to the regeneration subsystem 932 to facilitate release of carbon dioxide 906' in order to move the carbon dioxide 906' to carbon storage 922 (e.g., to the kiln 516 of FIGS. 5 and 6A). In some cases, the regeneration agents 934 may also facilitate regeneration of all or a portion of the carbon-capture medium 912, such that the carbon-capture medium 912 (with captured carbon dioxide 906' removed) can be returned to the air contactor 910.

Figure 9D:
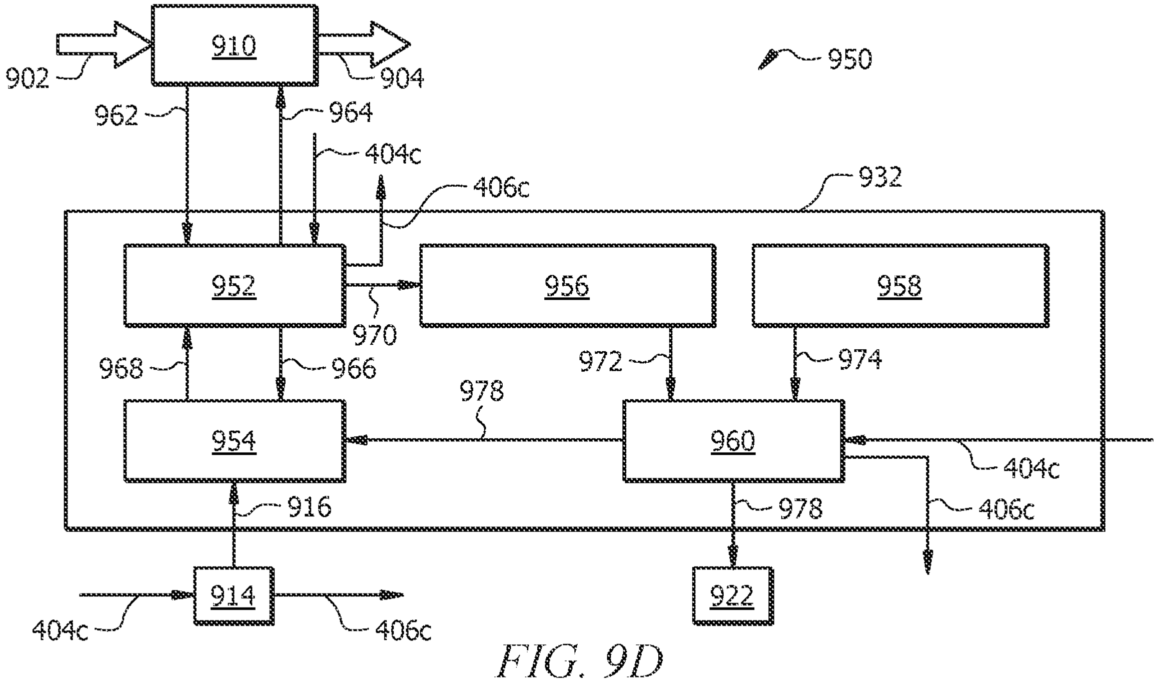
FIG. 9D is a diagram of an example carbon capture system that employs a solution-phase carbon-capture medium.

FIG. 9D shows another example carbon capture system 950 that can be used as carbon capture system 628 of FIG. 6A in which the carbon-capture medium 912 is dissolved or dispersed in a solution stored within the air contactor 910, such that following contact with carbon dioxide 906, the carbon-capture medium 912 is converted to a carbon-containing intermediate. In the example of FIG. 9D, the regeneration subsystem 932 includes a causticizer 952, slaker 954, clarifier and filter press 956, oxygen unit 958, and calciner 960. The regeneration subsystem 932 could include more or fewer components depending on the carbon-capture medium that is used. In the example carbon capture system 950, a caustic solution is used as the carbon-capture medium 912. For example, the air contactor 910 may contain a caustic solution that reacts with carbon dioxide in the gaseous products 902 to form a solution-phase carbon-containing product. As an example, the carbon-capture medium 912 may be potassium hydroxide (KOH). In such a case, the following reaction may occur in the air contactor 910:

$$2KOH\ (aq) + CO_2\ (g) \rightarrow H_2O\ (l) + K_2CO_3\ (aq) \tag{1}$$

This example reaction for carbon capture is exothermic. As such, the air contactor 910 may be cooled (e.g., using an absorption chiller 914 powered by geothermal energy, as described above) to maintain an appropriate reaction temperature without the temperature in the air contactor 910 becoming elevated beyond a maximum level and/or to maintain the temperature in the air contactor 910 at a target temperature or within a target temperature range.

In order to remove carbon dioxide to be returned to kiln 516 of FIGS. 5 and 6A and regenerate the carbon-capture medium 912, a stream 962 of the carbon-containing product (e.g., $K_2CO_3$ and $H_2O$) is sent to the causticizer 952. The causticizer 952 may be any appropriate vessel for performing the operations described in this disclosure. The causticizer 952 may receive a flow 968 of a caustic solution from the slaker 954 (described further below). The flow 968 of caustic solution may, for example, include calcium hydroxide ($Ca(OH)_2$). The reaction occurring in the causticizer 952 may be:

$$K_2CO_3\ (aq) + Ca(OH)_2\ (aq) \rightarrow 2KOH\ (aq) + CaCO_3\ (s) \tag{2}$$

In the causticizer 952, the carbon-capture medium 912 (KOH in this example) is regenerated, and the captured carbon is transferred to a solid carbon-containing intermediate substance ($CaCO_3$ in this example). The reaction of the causticizer 952 may be an endothermic reaction that requires an energy input (e.g., as heat) to drive the reaction. In such cases, heat transfer fluid 404*c* may be used to increase the temperature of the causticizer 952 and/or adjust the temperature within the causticizer 952 to a target temperature or target temperature range to improve the reaction (e.g., increase reaction rate). For example, the causticizer 952 may receive the carbon-containing intermediate (e.g., $K_2CO_3$) and contact the carbon-containing intermediate with a caustic solution (e.g., $Ca(OH)_2$). This mixture is then heated using heated heat transfer fluid (e.g., either heat transfer fluid 404*c* directly or another fluid heated by heat transfer fluid 404*c*). This heating helps drive the reaction to regenerate the carbon-capture medium 912 and form the solid carbon-containing intermediate.

The regenerated carbon-capture medium 912 (e.g., KOH) is provided back to the air contactor 910 via stream 964. The solid carbon-containing substance ($CaCO_3$ in this example) may be provided in stream 970 to a clarifier and filter press 956. The clarifier and filter press 956 is any vessel configured to separate the solid calcium-containing substance from water. Any appropriate existing or to be developed clarifier and filter press 956 may be used in the example system 950.

A flow 972 of the clarified and filtered carbon-containing solid substance (e.g., $CaCO_3$) may be provided to a calciner 960. In some cases, the flow 972 may be provided to the kiln 516 of FIGS. 5 and 6A as a feedstock for the sintering process (e.g., as one of the other components 512 included in the cement precursor 514 provided to the kiln 516). The calciner 960 releases carbon dioxide from the solid carbon-containing substance. The calciner 960 is any appropriate vessel in which such a rection can proceed. For example, the calciner 960 may receive the solid carbon-containing intermediate substance (e.g., $CaCO_3$) and heat this intermediate substance using the heat transfer fluid heated by the geothermal system (via heat transfer fluid 404*c*). This releases carbon dioxide from the carbon-containing substance. An example reaction occurring in the calciner 960 is:

$$CaCO_3\,(s) \rightarrow CaO\,(s) + CO_2\,(g) \quad (3)$$

The calciner 960 may receive solid carbon-containing substance via flow 972 along with oxygen via flow 974 from an oxygen unit 958 or any other appropriate source of oxygen. The oxygen unit 958 may be an air separation device with a filter that separates oxygen from ambient air. Released carbon dioxide is provided to the carbon storage 922 (e.g., kiln 516 of FIGS. 5 and 6A) via flow 978. The reaction of the calciner 960 may be an endothermic reaction that requires an energy input (e.g., as heat) to drive the reaction. In such cases, heat transfer fluid 404*c* may be used to increase the temperature of the calciner 960 and/or adjust the temperature within the calciner 960 to a target temperature or target temperature range to improve reaction (e.g., increase reaction rate).

Byproduct (e.g., CaO (s)) from the calciner 960 may be recycled using slaker 954 to regenerate material used in the causticizer 952 (e.g., $Ca(OH)_2$). For example, a flow 978 from the calciner 960 to the slaker 954 may include calcium oxide that can be dissolved in water to form calcium hydroxide used in the causticizer 952. The slaker 954 may be any appropriate vessel for supporting such a reaction. Water may be provided from the causticizer 952 to the slaker 954 via flow 966. An example reaction occurring in the slaker 954 is:

$$CaO\,(s) + H_2O\,(l) \rightarrow Ca(OH)_2\,(aq) \quad (4)$$

In some cases, the reaction in the slaker 954 is exothermic. In such cases, the slaker 954 may be cooled (e.g., using an absorption chiller 914 powered by geothermal energy, as described above) to maintain an appropriate reaction temperature without the temperature in the slaker 954 becoming elevated beyond a maximum level and/or to maintain the temperature in the slaker 954 at a target temperature or within a target temperature range.

Movement of fluids between components of the example regeneration subsystem 932 shown in FIG. 9D may be achieved using one or more fluid pumps. These fluid pump(s) may be powered at least in part using energy from the wellbore 302 (e.g., using heat transfer fluid 404*c*). For example, a thermally powered motor 506 may be used.

Example Method of Operating a Geothermally Powered Carbon Capture System

Figure 10:
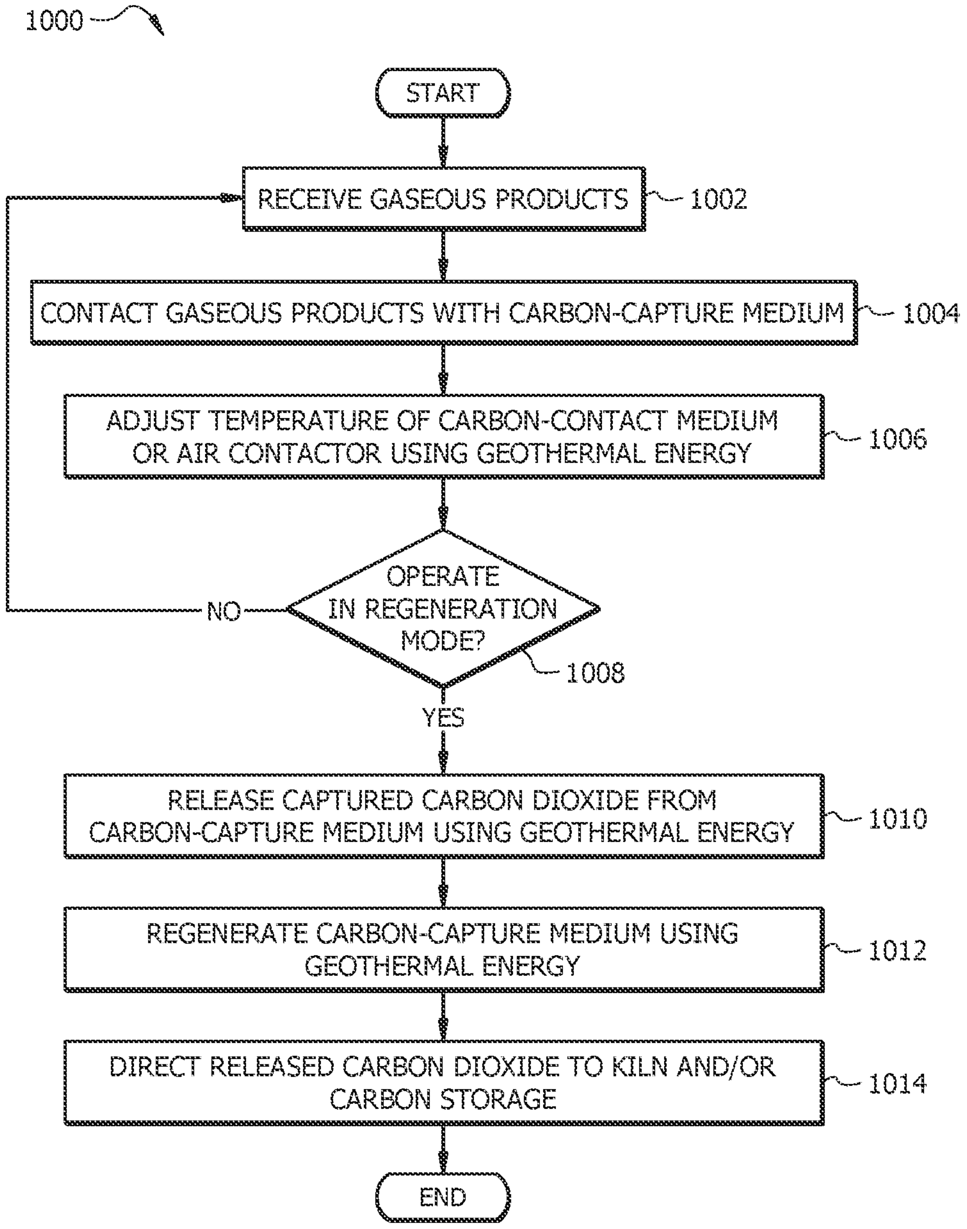
FIG. 10 is a flowchart of an example method for operating a carbon capture system of this disclosure.

FIG. 10 illustrates an example method 1000 of operating the carbon capture systems of this disclosure. The method 1000 may begin at step 1002 where gaseous products 902 are received. At step 1004, the gaseous products 902 are contacted to the carbon-capture medium 912. At step 1006, the temperature of the carbon-capture medium 912 or air contactor 910 may be modified or adjusted using geothermal energy. For example, the air contactor 910 holding the carbon-capture medium 912 may be cooled using an absorption chiller 914 or heated directly or indirectly using heat transfer fluid 404*c*. At step 1008, a determination is made of whether regeneration of the carbon-capture medium 912 is needed. For example, regeneration may be needed when a solid-phase carbon-capture medium 912 becomes sufficiently saturated with carbon dioxide or a predetermined amount of a solution-phase carbon-capture medium 912 is consumed. If regeneration is not needed, the method 1000 returns to step 1002 to continue receiving gaseous products 902 for carbon dioxide removal. Otherwise, if regeneration is needed, the method 1000 proceeds to step 1010.

At step 1010, captured carbon dioxide is released using geothermal energy. For example, carbon-capture medium 912 may be heated directly or indirectly using heat transfer fluid 404*c* to release captured carbon dioxide.

At step 1012, the carbon-capture medium 912 is regenerated. For example, a solid-phase carbon-capture medium 912 may be regenerated by heating the carbon-capture medium 912 to release bound carbon dioxide. In such cases, regeneration may be achieved simultaneously with the carbon dioxide release of step 1010. For a solution-phase carbon-capture medium 912, additional steps may be used to regenerate the solution-phase carbon-capture medium 912, for instance, as described above with respect to FIG. 9D. At step 1014, the released carbon dioxide is directed to the kiln 516 or separate carbon storage.

Modifications, omissions, or additions may be made to method 1000 depicted in FIG. 10. Method 1000 may include more, fewer, or other steps. For example, at least certain steps may be performed in parallel or in any suitable order. Any suitable component(s) of a carbon capture system may perform or may be used to perform one or more steps of the method 1000.

This disclosure describes example systems that may facilitate improved geothermal operations. While these example systems are described as employing heating through thermal contact with a magma reservoir 214, it should be understood that this disclosure also encompasses similar systems in which another thermal reservoir or heat source is harnessed. For example, heat transfer fluid may be heated by underground water at an elevated temperature. As another example, heat transfer fluid may be heated by radioactive material emitting thermal energy underground or at or near the surface. As yet another example, heat transfer fluid may be heated by lava, for example, in a lava lake or other formation. As such, the magma reservoir 214 of FIGS. 3 and 4 may be any thermal reservoir or heat source that is capable of heating heat transfer fluid to achieve desired properties (e.g., of temperature and pressure). Furthermore, the thermal reservoir or heat source may be naturally occurring or artificially created (e.g., by introducing heat underground that can be harnessed at a later time for energy generation or other thermal processes).

Additional Embodiments

The following descriptive embodiments are offered in further support of the one or more aspects of this disclosure:

Embodiment 1. A system comprising:

a geothermal system comprising a wellbore extending from a surface into an underground magma reservoir, the wellbore configured to heat a heat transfer fluid via heat transfer with the underground magma reservoir, thereby providing heated heat transfer fluid; and a cement product system comprising:

a kiln configured to:

receive a cement precursor; and sinter the received cement precursor using heat derived, at least in part, from the heated heat transfer fluid, thereby generating a clinker; and a mill configured to mix the clinker with one or more other components to generate cement, and optionally one or more of the following limitations:

an air heater configured to heat air using the heated heat transfer fluid to form heated air, wherein the heated air is provided into the kiln;

wherein the kiln comprises:

a lining; and a heat exchanger disposed in or on a surface of the lining, the heat exchanger configured to:

receive the heated heat transfer fluid; and transfer heat from the heated heat transfer fluid into the kiln;

wherein the heat exchanger is embedded within the lining;

wherein the kiln comprises:

a burner pipe configured to direct a flammable material into the kiln; and a heat exchanger configured to heat the burner pipe using the heated heat transfer fluid;

wherein the heat exchanger comprises a coil adjacent to or in contact with the burner pipe;

one or more geothermally powered motors configured to use the heated heat transfer fluid to perform mechanical operations of the cement production system, wherein the mechanical operations comprise one or more of:

powering a crusher;

powering a blending subsystem;

powering movable components of the kiln; and powering the mill;

a heat-driven chiller configured to:

receive the heated heat transfer fluid;

generate a cooling fluid using the received heat transfer fluid; and provide the cooling fluid to a cooler configured to cool the clinker prior to the clinker being mixed with the other components in the mill;

a carbon capture system configured to:

collect carbon dioxide from a gas exiting the kiln; and direct all or a portion of the collected carbon dioxide into the kiln, such that at least a portion of carbon from the carbon dioxide directed into the kiln is incorporated into the clinker.

Embodiment 2. A method of producing cement, the method comprising:

heating a heat transfer fluid via heat transfer with an underground magma reservoir, thereby generating a heated heat transfer fluid;

receiving, by a kiln, a cement precursor;

sintering, by the kiln, the received cement precursor using heat derived, at least in part, from the heated heat transfer fluid, thereby generating a clinker; and mixing the clinker with one or more other components to generate the cement, and optionally one or more of the following limitations:

by an air heater, heating air using the heated heat transfer fluid to form heated air, wherein the heated air is provided into the kiln;

by a heat exchanger disposed in or on a surface of a lining of the kiln:

receiving the heated heat transfer fluid; and transferring heat from the heated heat transfer fluid into the kiln;

wherein the heat exchanger is embedded within the lining;

directing a flammable material into the kiln via a burner pipe; and heating the burner pipe by flowing the heated heat transfer fluid through a heat exchanger;

wherein the heat exchanger comprises a coil adjacent to or in contact with the burner pipe;

using the heated heat transfer fluid to perform mechanical operations for producing the cement, wherein the mechanical operations comprise one or more of:

powering a crusher;

powering a blending subsystem;

powering movable components of the kiln; and powering a mill;

by a heat-driven chiller:

receiving the heated heat transfer fluid;

generating a cooling fluid using the received heated heat transfer fluid; and providing the cooling fluid to a cooler configured to cool the clinker prior to the clinker being mixed with the one or more other components; and collecting carbon dioxide from a gas exiting the kiln; and directing all or a portion of the collected carbon dioxide into the kiln, such that at least a portion of carbon from the carbon dioxide directed into the kiln is incorporated into the clinker.

Embodiment 3. A cement production system comprising:

a kiln configured to:

receive a cement precursor; and sinter the received cement precursor at least in part using a heated heat transfer fluid received from a geothermal system, thereby generating a clinker; and a mill configured to mix the clinker with one or more other components to generate cement, and optionally:

an air heater configured to heat air provided into the kiln using the heated heat transfer fluid.

Although embodiments of the disclosure have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. Moreover, items shown or discussed as coupled or directly coupled or communicating with each other may be indirectly coupled or communicating through some interface device, or intermediate component whether electrically, mechanically, fluidically, or otherwise.

While this disclosure has been particularly shown and described with reference to preferred or example embodiments, it will be understood by those skilled in the art that various changes in form and detail may be made therein without departing from the spirit and scope of the disclosure. Accordingly, this disclosure includes all modifications and equivalents of the subject matter recited in the claims appended hereto as permitted by applicable law. Changes, substitutions and alterations are ascertainable by one skilled in the art and could be made without departing from the spirit and scope disclosed herein. Moreover, any combination of the above-described elements in all possible variations thereof is encompassed by the disclosure unless otherwise indicated herein or otherwise clearly contradicted by context.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

What is claimed is:

1. An industrial system, comprising:
- a geothermal system comprising a wellbore extending from a surface into an underground magma reservoir, the wellbore configured to heat a heat transfer fluid via heat transfer with the underground magma reservoir, thereby providing heated heat transfer fluid; and a cement product system comprising:
- a kiln configured to:
  - receive a cement precursor; and
  - sinter the received cement precursor using heat derived, at least in part, from the heated heat transfer fluid, thereby generating a clinker; and
- a mill configured to mix the clinker with one or more other components to generate cement;
- wherein the kiln comprises:
  - a lining; and
  - a heat exchanger disposed in or on a surface of the lining, the heat exchanger configured to:
    - receive the heated heat transfer fluid; and
    - transfer heat from the heated heat transfer fluid into the kiln.

2. The industrial system of claim 1, further comprising an air heater configured to heat air using the heated heat transfer fluid to form heated air, wherein the heated air is provided into the kiln.

3. The industrial system of claim 1, wherein the heat exchanger is embedded within the lining.

4. The industrial system of claim 1, wherein the kiln comprises:
- a burner pipe configured to direct a flammable material into the kiln; and
- the heat exchanger configured to heat the burner pipe using the heated heat transfer fluid.

5. The industrial system of claim 4, wherein the heat exchanger comprises a coil adjacent to or in contact with the burner pipe.

6. The industrial system of claim 4, further comprising one or more geothermally powered motors configured to use the heated heat transfer fluid to perform mechanical operations of the cement production system, wherein the mechanical operations comprise one or more of:
- powering a crusher;
- powering a blending subsystem;
- powering movable components of the kiln; and
- powering the mill.

7. The industrial system of claim 1, further comprising a heat-driven chiller configured to:
- receive the heated heat transfer fluid;
- generate a cooling fluid using the received heat transfer fluid; and
- provide the cooling fluid to a cooler configured to cool the clinker prior to the clinker being mixed with the other components in the mill.

8. The industrial system of claim 1, further comprising a carbon capture system configured to:
- collect carbon dioxide from a gas exiting the kiln; and
- direct all or a portion of the collected carbon dioxide into the kiln, such that at least a portion of carbon from the carbon dioxide directed into the kiln is incorporated into the clinker.

9. A method of producing cement, the method comprising:
- heating a heat transfer fluid, transported through a wellbore extending from a surface into an underground magma reservoir, via heat transfer with the underground magma reservoir, thereby generating a heated heat transfer fluid;
- receiving, by a kiln, a cement precursor;
- sintering, by the kiln, the received cement precursor using heat derived, at least in part, from the heated heat transfer fluid, thereby generating a clinker;
- mixing, with a mill, the clinker with one or more other components to generate the cement, and
- by a heat exchanger disposed in or on a surface of a lining of the kiln:
  - receiving the heated heat transfer fluid; and
  - transferring heat from the heated heat transfer fluid into the kiln.

10. The method of claim 9, further comprising, by an air heater, heating air using the heated heat transfer fluid to form heated air, wherein the heated air is provided into the kiln.

11. The method of claim 9, wherein the heat exchanger is embedded within the lining.

12. The method of claim 9, further comprising:
- directing a flammable material into the kiln via a burner pipe; and
- heating the burner pipe by flowing the heated heat transfer fluid through the heat exchanger.

13. The method of claim 12, wherein the heat exchanger comprises a coil adjacent to or in contact with the burner pipe.

14. The method of claim 12, further comprising using the heated heat transfer fluid to perform mechanical operations for producing the cement, wherein the mechanical operations comprise one or more of:
- powering a crusher;
- powering a blending subsystem;
- powering movable components of the kiln; and
- powering a mill.

15. The method of claim 9, further comprising, by a heat-driven chiller:
- receiving the heated heat transfer fluid;
- generating a cooling fluid using the received heated heat transfer fluid; and
- providing the cooling fluid to a cooler configured to cool the clinker prior to the clinker being mixed with the one or more other components.

16. The method of claim 9, further comprising: collecting carbon dioxide from a gas exiting the kiln; and directing all or a portion of the collected carbon dioxide into the kiln, such that at least a portion of carbon from the carbon dioxide directed into the kiln is incorporated into the clinker.

17. A cement production system, comprising:

a kiln configured to:

receive a cement precursor; and sinter the received cement precursor at least in part using a heated heat transfer fluid received from a geothermal system, comprising a wellbore extending from a surface into an underground magma reservoir, the wellbore configured to heat a heat transfer fluid via heat transfer with the underground magma reservoir, thereby generating a clinker; and a mill configured to mix the clinker with one or more other components to generate cement;

wherein the kiln comprises:

a lining; and a heat exchanger disposed in or on a surface of the lining, the heat exchanger configured to:

receive the heated heat transfer fluid; and transfer heat from the heated heat transfer fluid into the kiln.

18. The cement production system of claim 17, further comprising an air heater configured to heat air provided into the kiln using the heated heat transfer fluid.

* * * * *